(12) United States Patent
Matsumoto et al.

(10) Patent No.: US 10,205,188 B2
(45) Date of Patent: Feb. 12, 2019

(54) MANUFACTURING METHOD FOR SECONDARY BATTERY AND SECONDARY BATTERY

(71) Applicant: TOYOTA JIDOSHA KABUSHIKI KAISHA, Toyota-shi, Aichi-ken (JP)

(72) Inventors: Mizuho Matsumoto, Toyota (JP); Masashi Kato, Konan (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 335 days.

(21) Appl. No.: 14/960,810

(22) Filed: Dec. 7, 2015

(65) Prior Publication Data

US 2016/0164133 A1 Jun. 9, 2016

(30) Foreign Application Priority Data

Dec. 9, 2014 (JP) ................................. 2014-248667

(51) Int. Cl.
| | |
|---|---|
| H01M 2/26 | (2006.01) |
| H01M 2/30 | (2006.01) |
| H01M 10/04 | (2006.01) |
| H01M 2/18 | (2006.01) |
| H01M 10/0585 | (2010.01) |
| H01M 10/0587 | (2010.01) |

(52) U.S. Cl.
CPC ........... *H01M 10/049* (2013.01); *H01M 2/18* (2013.01); *H01M 2/26* (2013.01); *H01M 2/30* (2013.01); *H01M 10/0585* (2013.01); *H01M 10/0587* (2013.01)

(58) Field of Classification Search
CPC ........... H01M 10/049; H01M 10/0585; H01M 10/0587; H01M 2/18; H01M 2/26; H01M 2/30; H01M 2/0217
USPC ........................................ 429/179, 181, 185
See application file for complete search history.

(56) References Cited

U.S. PATENT DOCUMENTS

| | | | | |
|---|---|---|---|---|
| 6,692,866 | B2* | 2/2004 | Watanabe | H01M 2/18 429/128 |
| 6,743,546 | B1* | 6/2004 | Kaneda | H01M 2/021 429/127 |
| 2006/0257730 | A1 | 11/2006 | Suzuki et al. | |
| 2008/0182472 | A1* | 7/2008 | Ogasawara | B29C 55/04 442/286 |
| 2009/0197160 | A1* | 8/2009 | Fujiwara | H01M 2/18 429/146 |
| 2012/0114987 | A1 | 5/2012 | Kogure et al. | |

FOREIGN PATENT DOCUMENTS

| | | |
|---|---|---|
| JP | 2000-323106 A | 11/2000 |
| JP | 2006-318671 A | 11/2006 |
| JP | 2011-070918 A | 4/2011 |
| JP | 2012-104336 A | 5/2012 |
| JP | 2014-038711 A | 2/2014 |
| JP | 2014-038736 A | 2/2014 |

OTHER PUBLICATIONS

Beginner's Books 20, "Hajimeteno Nijidenchi Gijyutsu (Introduction to Seconday Battery Technology)", Kogyo Chosakai Publishing Co. Ltd., 2001, First Edition, p. 135, 2 pgs. total.
Communication dated Dec. 13, 2016, issued by the Japan Patent Office in corresponding Japanese Application No. 2014-248667.

* cited by examiner

*Primary Examiner* — Anca Eoff
(74) *Attorney, Agent, or Firm* — Sughrue Mion, PLLC

(57) ABSTRACT

A manufacturing method for a secondary battery according to the invention includes an assembling step in which an insulating member having an insulating property is assembled to an electrode body, the insulating member having a first inclined portion and a second inclined portion provided so as to face each other in one end of the insulating member, as well as a gap provided between the first inclined portion and the second inclined portion. In the first inclined portion and the second inclined portion, inclined surfaces are formed on surfaces of the first inclined portion and the second inclined portion on sides facing each other, and are inclined in a direction in which the first inclined portion and the second inclined portion are separated from each other as the first inclined portion and the second inclined portion extend to tip sides.

4 Claims, 13 Drawing Sheets

MANUFACTURING METHOD FOR SECONDARY BATTERY AND SECONDARY BATTERY

INCORPORATION BY REFERENCE

The disclosure of Japanese Patent Application No. 2014-248667 filed on Dec. 9, 2014 including the specification, drawings and abstract is incorporated herein by reference in its entirety.

BACKGROUND OF THE INVENTION

1. Field of the Invention

The invention relates to a manufacturing method for a secondary battery and a secondary battery. To be in more detail, the invention relates to a manufacturing method for a secondary battery, and a secondary battery having an electrode body that is made by laminating positive and negative electrode plates while sandwiching a separator between the positive and negative electrode plates.

2. Description of Related Art

A secondary battery is made by housing an electrode body inside a battery case together with an electrolytic solution. For example, the electrode body is structured by laminating belt-like positive and negative electrode plates while sandwiching a separator between the positive and negative electrode plates, each of the positive and negative electrode plates being made by forming an active material layer containing an active material on a surface of current collector foil. Japanese Patent Application Publication No. 2014-38736 (JP 2014-38736 A) is listed as an example of a prior art related to a secondary battery having such an electrode body.

In JP 2014-38736 A, a secondary battery is described, which includes a laminated electrode assembly (an electrode body) inside a case, the electrode assembly being made by flat lamination of positive and negative electrode plates together with separators. In JP 2014-38736 A, in each of the electrode plates, there is a portion where an active material layer is not formed, thereby exposing current collector foil, and the portion projects more than a portion where the active material layer is formed. In the electrode body, an electrode tab is formed by bundling the exposed portions of the current collector foil in a projecting state.

In JP 2014-38736 A, the electrode tab is connected with a terminal provided in a cover member that closes an opening of the case in which the electrode body is inserted. Further, the secondary battery according to the JP 2014-38736 A has a film that covers the electrode body and is fixed to the cover member or the terminal. It is stated that, when inserting the electrode body in the case, the electrode body is inserted while the film covering the electrode body is receiving a load of the electrode body. It is thus possible to prevent the load of the electrode body from being applied onto the electrode tab, thereby restraining breakage of the electrode tab.

When the electrode body is inserted into the case from the opening of the case, a pressing load for pressing the electrode body towards the case is applied to the electrode body. In the related art like the one stated above, when inserting the electrode body into the case, an insertion load is applied normally to a side surface of the electrode body on the side where the electrode tab projects, out of the outer surface of the electrode body. However, strength of the side surface of the electrode body is not so high because the side surface is structured from end portions of the electrode plates and the separators. Thus, there was a possibility that the end portions of the electrode plates and the separators on the side surface of the electrode body, to which the insertion load is applied, could be deformed due to bending or breakage, and, due to the deformation of the electrode plates and the separators in the electrode body, quality of the secondary battery could be deteriorated.

SUMMARY OF THE INVENTION

The invention provides a manufacturing method for a secondary battery and the secondary battery, in which an electrode plate and a separator in an electrode body are prevented from being damaged.

In a manufacturing method for a secondary battery according to an aspect of the invention is a manufacturing method for a secondary battery in which an electrode body, a battery case, and an electrode terminal are included, the electrode body being made by laminating a positive electrode plate and a negative electrode plate while sandwiching a separator between the positive electrode plate and the negative electrode plate, the positive electrode plate and the negative electrode plate being made by forming an active material layer on current collector foil, the battery case having a case body in which an opening is formed, and a sealing member that covers the opening of the case body, the battery case housing the electrode body inside of the battery case, the electrode terminal being assembled to the sealing member and having a connecting end and an exposed end, the connecting end being connected with the electrode body on an inner side of the battery case, and the exposed end being exposed outside the battery case, in which the positive electrode plate and the negative electrode plate include charge and discharge parts and projecting portions, respectively, the charge and discharge parts being parts where the active material layers are formed and being superimposed on each other through the positive electrode plate, the negative electrode plate, and the separator due to lamination in the electrode body, the projecting portions being portions projecting from parts of end parts of the charge and discharge parts where the active material layers are not formed and the current collector foil is thus exposed, and the electrode body includes a lamination part and an electrode tab, the lamination part being made by laminating the charge and discharge parts of the positive electrode plate and the negative electrode plate together with the separator, the electrode tab being structured by bundling only the projecting portion of either the positive electrode plate or the negative electrode plate by lamination in a state of projecting from the lamination part, the electrode tab being connected with the connecting end of the electrode terminal, the electrode body being housed in the battery case so that a side surface of the electrode body, where the electrode tab projects, is directed towards the sealing member. The manufacturing method for the secondary battery includes manufacturing the electrode body, by which the electrode body is made by laminating the positive electrode plate, the negative electrode plate, and the separator while allowing the electrode tab to project from a side surface of the lamination part, manufacturing and assembling an assembly of an insulating member, the electrode body, the sealing member, and the electrode terminal by assembling the insulating member having an insulating property, the electrode body, the sealing member, and the electrode terminal, the insulating member having a first inclined portion and a second inclined portion provided in one end of the insulating member so that the first inclined portion and the second inclined portion face each other, and also having a gap provided between the first inclined portion and the second inclined portion, where inclined surfaces are thus formed on surfaces of the first inclined portion and the second inclined portion on sides facing each other, the inclined surfaces being inclined in a direction in which the first inclined portion and the second inclined portion are separated from each other as the first inclined portion and the second inclined portion extend to tip sides, and inserting the electrode body of the assembly inside the case body. When carrying out the assembling, the insulating member is assembled to the electrode tab at a position between a connecting place of the electrode tab, which is connected with the connecting end of the electrode terminal, and the lamination part, in a state where the tip sides of the first inclined portion and the second inclined portion are directed towards the lamination part, by sandwiching the electrode tab by using the inclined surfaces of the first inclined portion and the second inclined portion from outer sides in a lamination direction, and by passing the electrode tab through the gap between the first inclined portion and the second inclined portion, thus allowing the connecting place to project to the other end on an opposite side of the first inclined portion and the second inclined portion. When carrying out the assembling, the electrode terminal is assembled to the sealing member so that the exposed end projects on an outer surface of the sealing member on an outer side of the battery case, and the insulating member is sandwiched between both outer-side surfaces of the electrode tab in the lamination direction, and an inner surface of the sealing member on an inner side of the battery case, thereby structuring the assembly, the outer-side surfaces being sandwiched between the inclined surfaces of the first inclined portion and the second inclined portion. When carrying out the assembling, the connecting end of the electrode terminal is connected with the connecting place of the electrode tab. When inserting the electrode body inside the case body, the electrode body is inserted inside the case body by pressing the outer surface of the sealing member towards inside the case body while directing a side surface of the electrode body, on an opposite side of a side surface where the electrode tab projects, towards the opening of the case body.

In the manufacturing method for a secondary battery according to the invention, a pressing load applied to the outer surface of the sealing member in the insertion step is applied to the electrode tab through the insulating member. A part of the electrode tab, to which the pressing load is applied, is a part sandwiched between the first inclined portion and the second inclined portion of the insulating member. In other words, the part of the electrode tab, which is sandwiched between the first inclined portion and the second inclined portion, is inclined along the inclined surfaces of the first inclined portion and the second inclined portion in a direction in which the part of the electrode tab becomes narrow in the lamination direction as it extends from the lamination part. In the part of the electrode tab, which is in contact with the inclined surfaces of the first inclined portion and the second inclined portion, end portions of the electrode plates and so on are not exposed. The part of the electrode tab, which is in contact with the inclined surfaces of the first inclined portion and the second inclined portion, is able to receive the pressing load from the inclined surfaces of the first inclined portion and the second inclined portion in a thickness direction of the plurality of projecting portions that structure the part in proportion to the inclination of the inclined surfaces. Since the part of the electrode tab, which is in contact with the inclined surfaces of the first inclined portion and the second inclined portion, is structured by laminating the plurality of projecting portions, the part of the electrode tab has high strength against pressing in the thickness direction of the projecting portions. Therefore, with the manufacturing method for a secondary battery according to the invention, it is possible to prevent the electrode plates and the separators in the electrode body from being damaged.

In the foregoing manufacturing method for a secondary battery, as the insulating member, it is preferred that an insulating member is used, in which inclination angles of the inclined surfaces of the first inclined portion and the second inclined portion with respect to the lamination direction of the assembly are within a range of 30° or larger but not exceeding 60°. When the inclination angles of the inclined surfaces of the first inclined portion and the second inclined portion are too small or too big, a load applied to the electrode tab in the insertion step could cause breakage and so on of the electrode tab.

In the foregoing manufacturing method for a secondary battery, when carrying out the assembling, the insulating member may be assembled before the terminal connecting step. By assembling the insulating member, the connecting place of the electrode tab, which is connected with the electrode terminal in the terminal connecting step, is gathered in the thickness direction. In other words, the connecting place, with which the electrode terminal is connected in the terminal connecting step, is formed in a tip side of the electrode tab in a projecting direction compared to a part of the electrode tab sandwiched between the first inclined portion and the second inclined portion. Further, the electrode tab is sandwiched between the first inclined portion and the second inclined portion, and the projecting portions that structure the electrode tab are thus restrained from shifting. Furthermore, tension to the electrode tab at the time of connection is alleviated. Therefore, it is possible to carry out the assembling effectively while preventing the projecting portions of the electrode tab from being damaged.

A secondary battery according to an aspect of the invention includes an electrode body that is made by laminating a positive electrode plate and a negative electrode plate while sandwiching a separator between the positive electrode plate and the negative electrode plate, the positive electrode plate and the negative electrode plate being made by forming an active material layer on current collector foil, a battery case, which has a case body in which an opening is formed, and a sealing member that covers the opening of the case body, the battery case housing the electrode body inside of the battery case, and an electrode terminal that is assembled to the sealing member and has a connecting end and an exposed end, the connecting end being connected with the electrode body on an inner side of the battery case, and the exposed end being exposed outside the battery case. The positive electrode plate and the negative electrode plate include charge and discharge parts and projecting portions, respectively, the charge and discharge parts being parts where the active material layers are formed and being superimposed on each other through the positive electrode plate, the negative electrode plate, and the separator due to lamination in the electrode body, and the projecting portions being portions where the active material layers are not formed and the current collector foil is thus exposed, the projecting portions projecting from parts of end parts of the charge and discharge parts. The electrode body includes a lamination part and an electrode tab, the lamination part being made by laminating the charge and discharge parts of the positive electrode plate and the negative electrode plate together with the separator, the electrode tab being structured by bundling only the projecting portion of either the positive electrode plate or the negative electrode plate by lamination in a state of projecting from the lamination part, the electrode tab being connected with the connecting end of the electrode terminal, and the electrode body is housed in the battery case so that a side surface of the electrode body, where the electrode tab projects, is directed towards the sealing member. In the secondary battery, an insulating member having an insulation property is provided and includes a first inclined portion and a second inclined portion in one end of the insulating member so that the first inclined portion and the second inclined portion face each other through a gap provided between the first inclined portion and the second inclined portion. In the first inclined portion and the second inclined portion, inclined surfaces are formed on surfaces of the first inclined portion and the second inclined portion on sides facing each other, the inclined surfaces being inclined in a direction in which the first inclined portion and the second inclined portion are separated from each other as the first inclined portion and the second inclined portion extend towards tip sides. The electrode tab includes an electrode tab inclined portion between a connecting place, which is connected with the connecting end of the electrode terminal, and the lamination part, the electrode tab inclined portion being inclined in a direction in which both outer-side surfaces of the projecting portion in a lamination direction become closer to each other as the outer surfaces extend from the lamination part. In a state where the tip sides of the first inclined portion and the second inclined portion are directed towards the lamination part, the insulating member allows the connecting place to project toward the other end on an opposite side of the first inclined portion and the second inclined portion by sandwiching both outer-side surfaces of the electrode tab inclined portion in the lamination direction by using the inclined surfaces of the first inclined portion and the second inclined portion, and also by passing the electrode tab through the gap between the first inclined portion and the second inclined portion, and further, the insulating member is sandwiched between the both outer-side surfaces of the electrode tab inclined portion in the lamination direction and the sealing member.

In the secondary battery according to the invention, a pressing load applied to an outer-side surface of the sealing member when inserting the electrode body inside the case body is applied to the electrode tab inclined portion of the insulating member. On both outer-side surfaces of the electrode tab inclined portion in the lamination direction, to which the pressing load is applied, end portions of the electrode plates and so on are not exposed. The electrode tab inclined portion is able to receive the pressing load from the inclined surfaces of the first inclined portion and the second inclined portion in proportion to the inclination of the inclined surfaces in a thickness direction of the plurality of projecting portions that structure the electrode tab inclined portion. Since the electrode tab inclined portion is structured by laminating the plurality of projecting portions, the electrode tab inclined portion has high strength against pressing in the thickness direction of the projecting portions. Therefore, with the secondary battery according to the invention, it is possible to prevent the electrode plates and the separators in the electrode body from being damaged.

In the foregoing secondary battery, in the insulating member, inclination angles of the inclined surfaces of the first inclined portion and the second inclined portion with respect to the lamination direction may be within a range of 30° or larger but not exceeding 60°. When the inclination angles of the inclined surfaces of the first inclined portion and the second inclined portion are too small or too big, a load applied to the electrode tab when inserting the electrode body could cause breakage and so on of the electrode tab.

According to the aspects of the invention, the manufacturing method for a secondary battery, and a secondary battery are provided, by which electrode plates and separators in an electrode body are prevented from being damaged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The best mode for embodying the invention is explained in detail with reference to the drawings. In this embodiment, the invention is applied to a lithium ion secondary battery having a lamination type electrode body.

Figure 1:
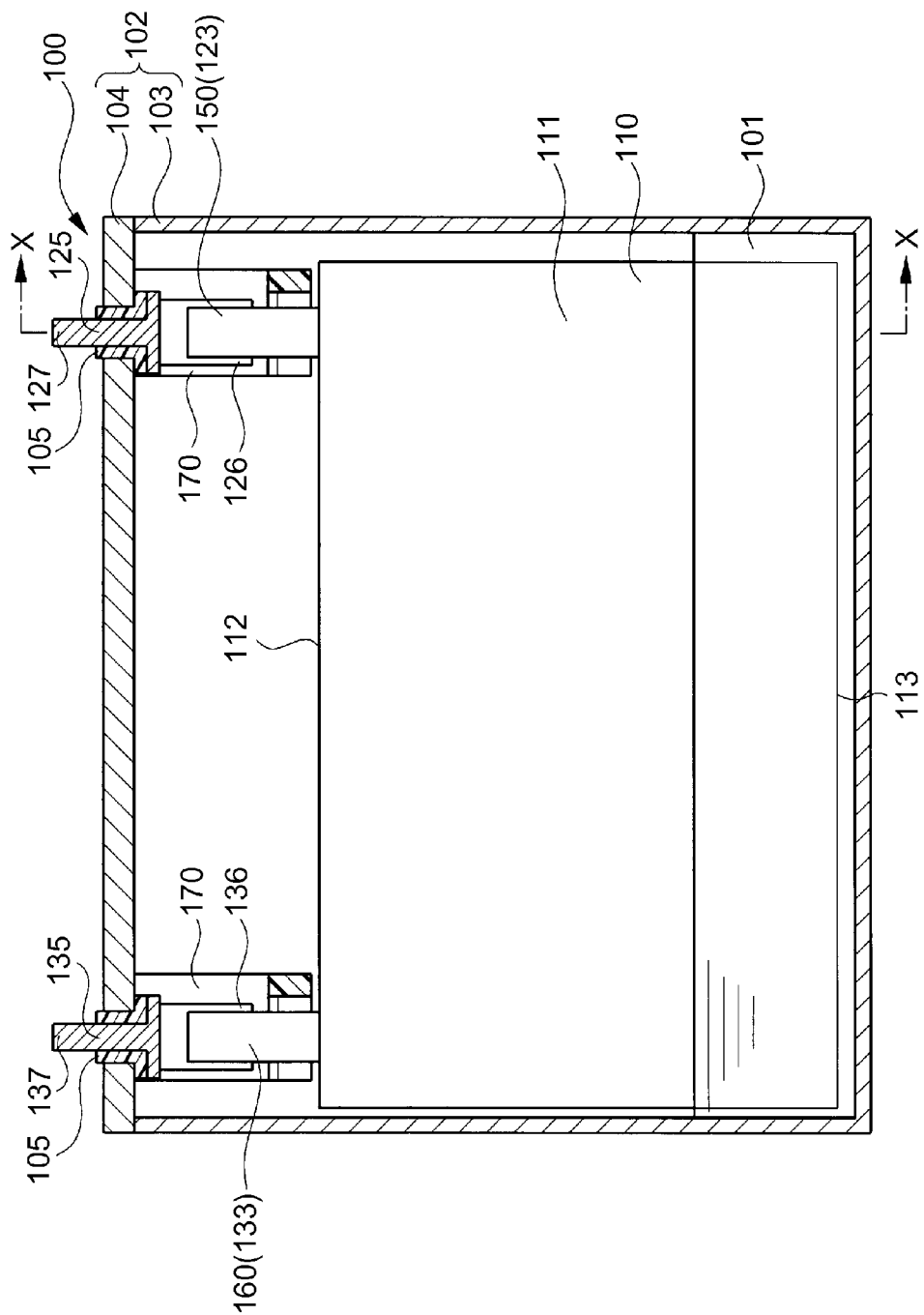
FIG. 1 is a front view of a battery according to the embodiment.
Figure 2:
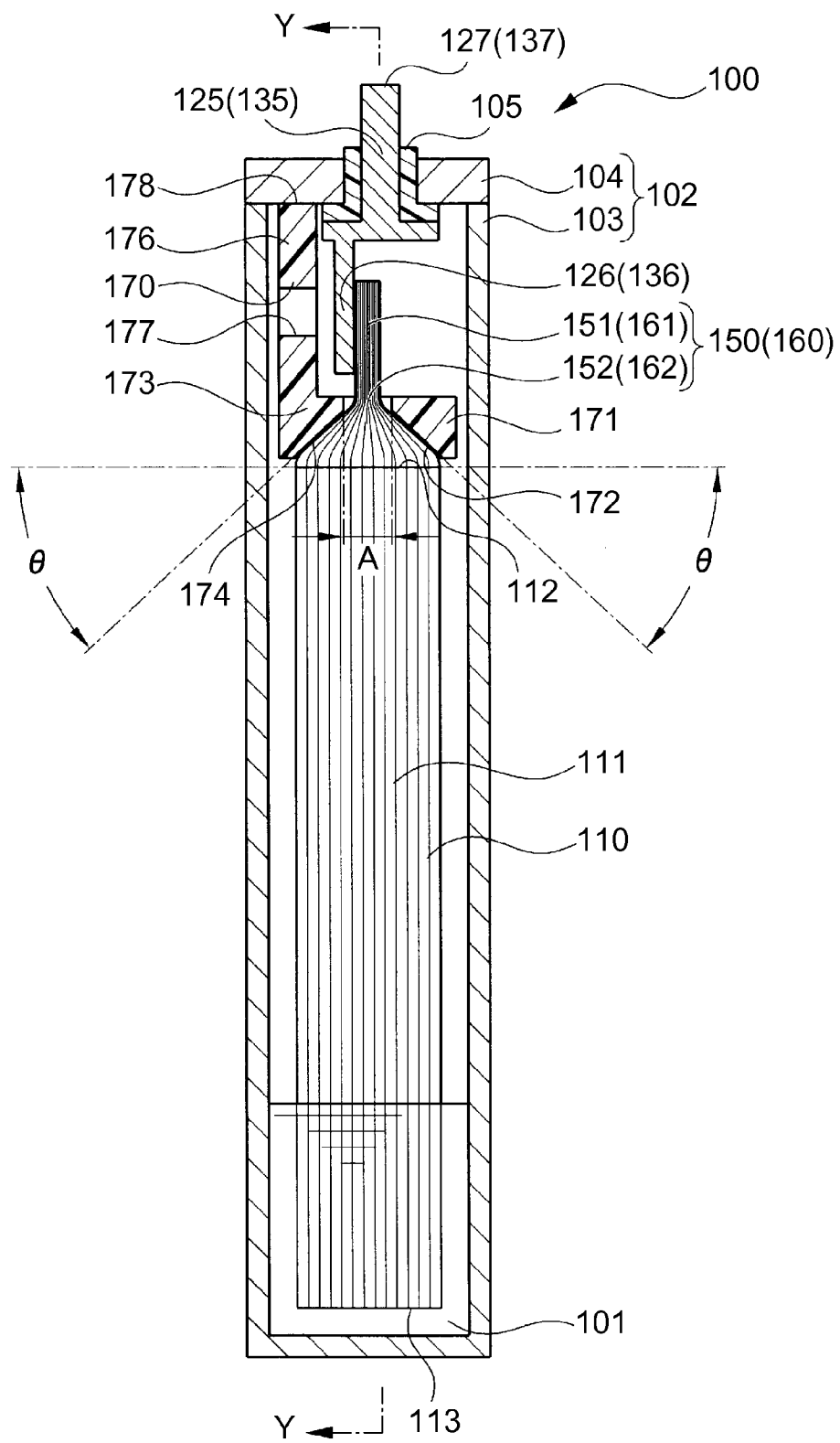
FIG. 2 is a sectional view along a position of a positive electrode terminal of the battery.

FIG. 1 and FIG. 2 show sectional views of a battery 100 according to this embodiment. FIG. 2 is a sectional view taken along the position X-X shown in FIG. 1. FIG. 1 is a sectional view taken along the position Y-Y shown in FIG. 2. As shown in FIG. 1, the battery 100 is a lithium ion secondary battery that is made by housing an electrode body 110 and an electrolytic solution 101 inside a battery case 102. The electrolytic solution 101 is made from an organic solvent in which lithium salt is dissolved. The battery case 102 includes a case body 103 and a sealing member 104. The sealing member 104 includes a gasket 105 that serves as an insulating member.

Figure 3:
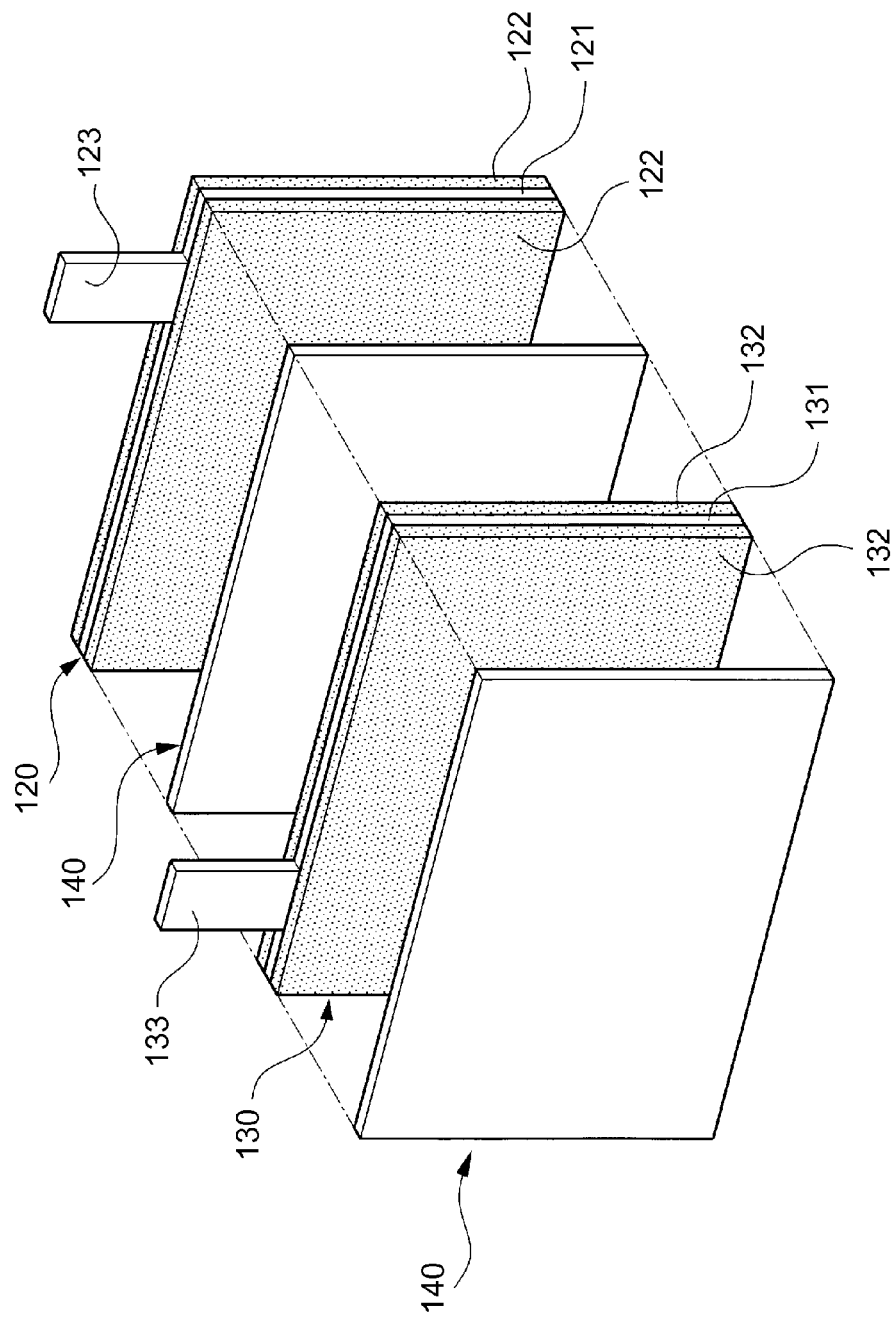
FIG. 3 is a view for explaining a negative electrode plate, a positive electrode plate, and a separator that structure an electrode body.

FIG. 3 is a view showing a positive electrode plate 120, a negative electrode plate 130, and a separator 140 that structure the electrode body 110. As shown in FIG. 3, the positive electrode plate 120 is made by forming a positive electrode active material layer 122 on both surfaces of positive electrode current collector foil 121 by using a positive electrode material such as a positive electrode active material and a binder. The positive electrode plate 120 also has a positive electrode projecting portion 123 projecting upwardly from a portion where the positive electrode active material layer 122 is formed. In the positive electrode projecting portion 123, the positive electrode active material layer 122 is not formed. In the positive electrode projecting portion 123, positive electrode current collector foil 121 is exposed because the positive electrode active material layer 122 is not formed.

The negative electrode plate 130 is made by forming a negative electrode active material layer 132 on both surfaces of negative electrode current collector foil 131 by using a negative electrode material such as a negative electrode active material and a binder. The negative electrode plate 130 also has a negative electrode projecting portion 133 projecting upwardly from a portion where the negative electrode active material layer 132 is formed. In the negative electrode projecting portion 133, the negative electrode active material layer 132 is not formed. In the negative electrode projecting portion 133, the negative electrode current collector foil 131 is exposed because the negative electrode active material layer 132 is not formed.

Active materials are contained in both the portion of the positive electrode plate 120, in which the positive electrode active material layer 122 is formed, and the portion in the negative electrode plate 130, in which the negative electrode active material layer 132 is formed. Therefore, the portion where the positive electrode active material layer 122 is formed in the positive electrode plate 120, and the portion where the negative electrode active material layer 132 is formed in the negative electrode plate 130 work as charge and discharge parts which contribute to charge and discharge in the battery 100. The separator 140 is a sheet-like porous member.

Then, the electrode body 110 according to this embodiment shown in FIG. 1 and FIG. 2 is made by laminating the pluralities of positive electrode plates 120, negative electrode plates 130, and separators 140. Specifically, the electrode body 110 is a lamination type electrode body that is made by flat lamination of the pluralities of positive electrode plates 120 and negative electrode plates 130 while sandwiching the separator 140 between the positive electrode plate 120 and the negative electrode plate 130. Further, as shown in FIG. 3, the positive electrode plates 120 and the negative electrode plates 130 in the electrode body 110 are laminated so that the charge and discharge parts, where the positive electrode active material layers 122 and the negative electrode active material layers 132 are formed, are superimposed on each other.

Thus, the electrode body 110 has a lamination part 111 in which the charge and discharge parts of the positive electrode plates 120 and the negative electrode plates 130, where the positive electrode active material layers 122 and the negative electrode active material layers 132 are formed, are superimposed on each other through the separator 140, respectively. The lamination part 111 is a part that transfers lithium ions through the electrolytic solution 101 held in pores of the separators 140, which is a porous member, between the positive electrode plates 120 and the negative electrode plates 130 when charging and discharging the battery 100.

In this embodiment, out of an outer surface of the lamination part 111 of the electrode body 110, surfaces excluding end surfaces in the lamination direction are regarded as side surfaces of the lamination part 111. In FIG. 1 and FIG. 2, out of the side surfaces of the lamination part 111, a side surface on an upper side is shown as an upper surface 112, and a side surface on a lower side is shown as a lower surface 113. Further, the side surfaces of the lamination part 111 including the upper surface 112 and the lower surface 113 are all structured from end portions of the positive electrode plates 120, the negative electrode plates 130, and the separators 140 that are laminated in the electrode body 110.

As shown in FIG. 1, in the electrode body 110, the pluralities of positive electrode projecting portions 123 and negative electrode projecting portions 133 project upwardly from the upper surface 112 of the lamination part 111. The plurality of positive electrode projecting portions 123 projecting from the lamination part 111 are bundled together, thus structuring a positive electrode tab 150. The plurality of negative electrode projecting portions 133 projecting from the lamination parts 111 are also bundled together, thus structuring a negative electrode tab 160.

As shown in FIG. 2, a connecting place 151 of the positive electrode tab 150 near a projecting tip of the positive electrode tab 150 is connected with a connecting end 126 of a positive electrode terminal 125. As shown in FIG. 2 in parentheses, a connecting place 161 near a projecting tip of the negative electrode tab 160 is also connected with a connecting end 136 of a negative electrode terminal 135.

In the positive electrode terminal 125, an exposed end 127, on the opposite side of the connecting end 126 connected with the positive electrode tab 150, is exposed outside the battery case 102 through the gasket 105. Also in the negative electrode terminal 135, an exposed end 137 on the opposite side of the connecting end 136 connected with the negative electrode tab 160 is exposed outside the battery case 102 through the gasket 105. Then, the battery 100 charges and discharges in the lamination part 111 of the electrode body 110 through the positive electrode terminal 125 and the negative electrode terminal 135.

As shown in FIG. 2, the positive electrode tab 150 according to this embodiment has a positive electrode tab inclined portion 152 between the connecting place 151 and the lamination part 111. The positive electrode tab inclined portion 152 is a portion where both outer-side surfaces of the plurality of positive electrode projecting portions 123 in the lamination direction are inclined so as to become narrow as they extend from the lamination part 111. As shown in FIG. 2 in parentheses, the negative electrode tab 160 also has a negative electrode tab inclined portion 162 between the connecting place 161 and the lamination part 111. The negative electrode tab inclined portion 162 is a portion where both outer-side surfaces of the negative electrode projecting portions 133 are inclined so as to become narrow as they extend from the lamination part 111.

Figure 4:
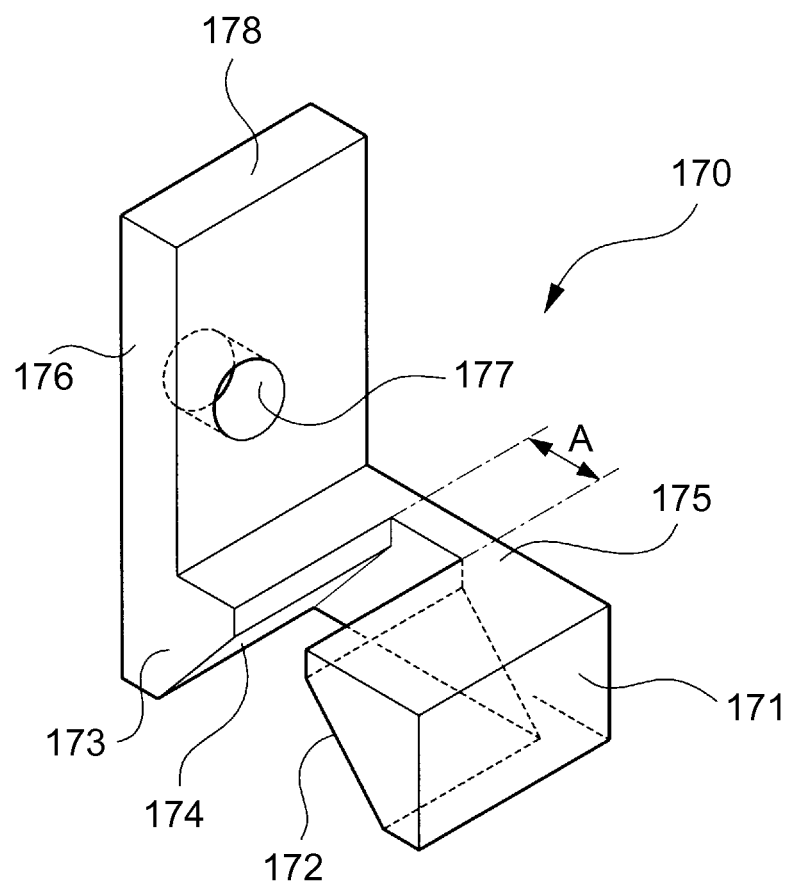
FIG. 4 is a perspective view of an insulating member.

Further, as shown in FIG. 1 and FIG. 2, the battery 100 according to this embodiment has insulating members 170, to which the positive electrode tab 150 and the negative electrode tab 160 are assembled, respectively. The insulating member 170 according to this embodiment is structured from polypropylene (PP) that is an insulating material. FIG. 4 shows a perspective view of the insulating member 170.

As shown in FIG. 4, the insulating member 170 has inclined portions 171, 173 that face each other. As shown in FIG. 4, the inclined portion 171 and the inclined portion 173 are formed so as to protrude to the front side from a linked portion 175 on a back side. A gap A is provided between the inclined portion 171 and the inclined portion 173. The gap A is narrower than a thickness of the lamination part 111 of the electrode body 110 in the lamination direction.

As shown in FIG. 4, in the inclined portion 171, an inclined surface 172 is formed on a surface on a side that faces the inclined portion 173. The inclined surface 172 is inclined so as to be away from the inclined portion 173 towards the lower side, which is a tip side of the inclined portion 171.

In the inclined portion 173, an inclined surface 174 is formed on a surface on a side that faces the inclined portion 171. The inclined surface 174 is inclined so as to be away from the inclined portion 171 towards the lower side that is a tip side of the inclined portion 173. In other words, the inclined surfaces 172, 174 are surfaces that are inclined so as to be away from each other as they extend towards the tip sides of the inclined portions 171, 173, respectively.

Further, the insulating member 170 has a connection portion 176 extending upwardly from the inclined portion 173 on the left side in FIG. 4. An end surface 178 is formed on an upper surface of the connection portion 176. The end surface 178 is a surface formed in the other end of the insulating member 170, on the opposite side of the inclined portions 171, 173 provided on one end of the insulating member 170.

In the connection portion 176, a through hole 177 is formed, which goes through the connection portion 176 in the thickness direction. The through hole 177 of the insulating member 170 is formed at a position corresponding to the connecting place 151 of the positive electrode tab 150 when the insulating member 170 is assembled to the positive electrode tab 150. The through hole 177 of the insulating member 170 is also formed at a position corresponding to the connecting place 161 of the negative electrode tab 160 when the insulating member 170 is assembled to the negative electrode tab 160.

The above-mentioned insulating members 170 are assembled to the positive electrode tab 150 and the negative electrode tab 160 in a state where the inclined portions 171, 173 face down as shown in FIG. 2. To be specific, the insulating members 170 are assembled to the positive electrode tab 150 and the negative electrode tab 160, respectively, in a state where the inclined portions 171, 173 face the lamination part 111 of the electrode body 110.

In the insulating members 170, the inclined surfaces 172 of the inclined portions 171 and the inclined surfaces 174 of the inclined portions 173 sandwich the positive electrode tab inclined portion 152 and the negative electrode tab inclined portion 162, respectively, from both outer-side surfaces. Therefore, the inclined surfaces 172, 174 are in contact with the outer-side surfaces of the positive electrode tab inclined portion 152 and the negative electrode tab inclined portion 162, respectively.

In the insulating member 170, the positive electrode tab 150 is passed through the gap A between the inclined portion 171 and the inclined portion 173. Then, the insulating member 170 allows the connecting place 151 of the positive electrode tab 150 to project towards the end surface 178 positioned in the other end on the opposite side of the inclined portions 171, 173. On the side of the negative electrode tab 160, the negative electrode tab 160 is passed through the gap A between the inclined portion 171 and the inclined portion 173, thus allowing the connecting place 161 to project towards the end surface 178 in the other end on the opposite side of the inclined portions 171, 173.

In the insulating member 170 according to this embodiment, the end surface 178 is in contact with a lower surface of the sealing member 104, that is an inner surface of the sealing member 104. Meanwhile, as stated above, the inclined surfaces 172, 174 on the opposite side of the end surface 178 are in contact with both inclined outer-side surfaces of the positive electrode tab inclined portion 152 and the negative electrode tab inclined portion 162, respectively. Therefore, the insulating members 170 are sandwiched between both outer-side surfaces of the positive electrode tab inclined portion 152 and the negative electrode tab inclined portion 162, and the sealing member 104. Since the insulating member 170 has an insulation property, insulation between the battery case 102 and the electrode body 110 is ensured.

FIG. 2 also shows angles θ of the inclined surfaces 172, 174 of the inclined portions 171, 173 with respect to the lamination direction of the electrode body 110. In the insulating member 170 according to this embodiment, the inclined surfaces 172, 174 are formed so that the angles θ fall into a range of 30° or larger but not exceeding 60°. The details are explained later.

Next, a manufacturing method for the battery 100 according to this embodiment is explained. Manufacturing procedures for the battery 100 according to this embodiment are explained below: 1. electrode body manufacturing step; 2. assembling step; and 3. insertion step.

First of all, in "1. electrode body manufacturing step", the electrode body 110 is manufactured by flat lamination of the positive electrode plates 120, the negative electrode plates 130, and the separators 140. As shown in FIG. 3, in the positive electrode plate 120 used in this step, the positive electrode active material layer 122 and the positive electrode projecting portion 123 are already formed. Also, as shown in FIG. 3, the negative electrode plate 130 is used, in which the negative electrode active material layer 132 and the negative electrode projecting portion 133 are already formed. In this step, lamination for the electrode body 110 is performed so that the charge and discharge parts are laminated in the lamination part 111 of the electrode body 110. In the charge and discharge parts, the positive electrode active material layers 122 and the negative electrode active material layers 132 of the positive electrode plates 120 and the negative electrode plates 130 are formed, respectively.

Each of the positive electrode plates 120 used in this step has the positive electrode projecting portion 123 formed at a position shown in FIG. 3. Each of the negative electrode plates 130 used has the negative electrode projecting portion 133 formed at the position shown in FIG. 3. In other words, as shown in FIG. 3, the position where the positive electrode projecting portion 123 of the positive electrode plate 120 is formed, and the position where the negative electrode projecting portion 133 of the negative electrode plate 130 is formed, are different from each other. By the lamination in this step, both the positive electrode projecting portion 123 of the positive electrode plate 120, and the negative electrode projecting portion 133 of the negative electrode plate 130 project from the upper surface 112 of the lamination part 111.

Therefore, due to the lamination in this step, all of the positive electrode projecting portions 123 of the positive electrode plates 120 project from the same position in the upper surface 112 of the lamination part 111 when seen in the lamination direction. The plurality of positive electrode projecting portions 123 projecting from the lamination part 111 form the positive electrode tab 150. Also, in the negative electrode plates 130, the negative electrode projecting portions 133 project from the same position in the upper surface 112 of the lamination part 111 when seen in the lamination direction. Therefore, in the negative electrode plate 130, the plurality of negative electrode projecting portions 133 projecting from the lamination part 111 also form the negative electrode tab 160.

Next, "2. assembling step" is carried out. In this step, the sealing member 104, the electrode body 110, the positive electrode terminal 125, the negative electrode terminal 135, and the insulating member 170 are assembled, thereby manufacturing an assembly thereof.

In the assembling step according to this embodiment, the assembly is manufactured in the procedures explained below: 2-1. insulating member assembling step; 2-2. assembly structuring step; and 2-3. terminal connecting step.

Figure 5:
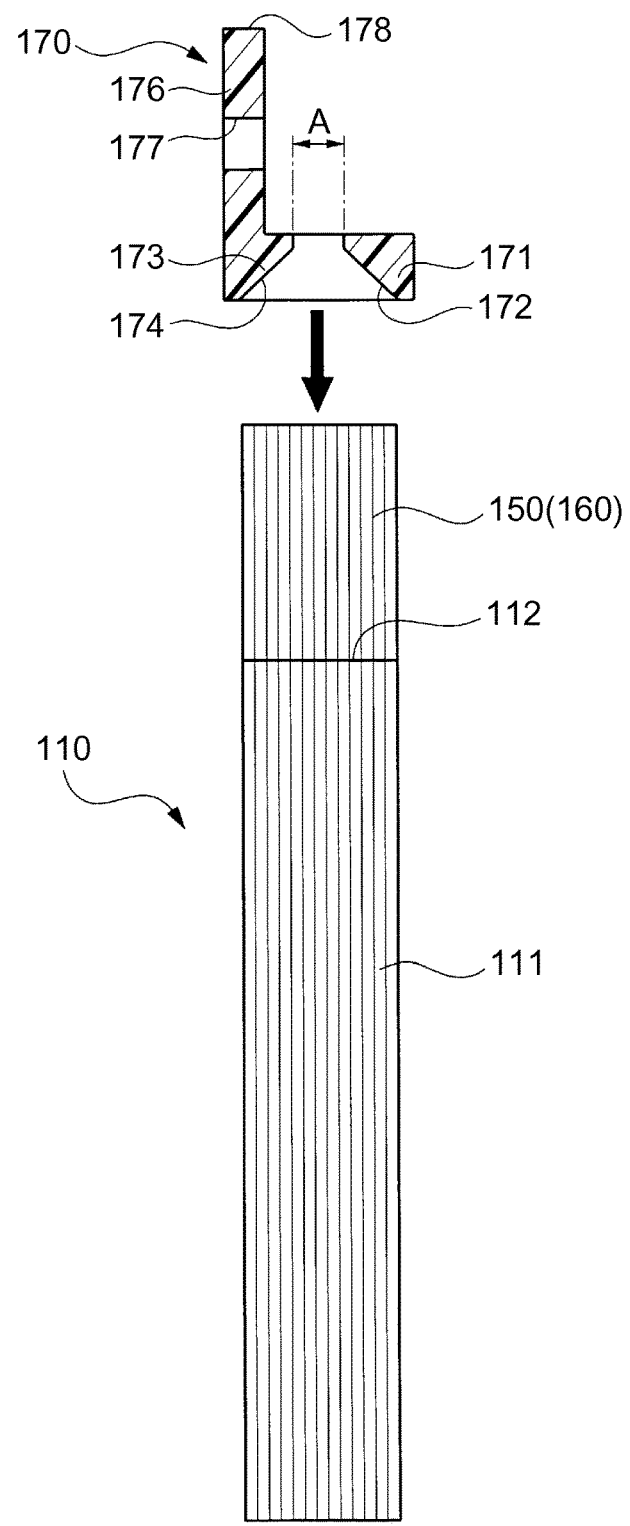
FIG. 5 is a view showing an electrode body before the insulating member is assembled.

"2. assembling step" according to this embodiment is explained in the above-stated order. First of all, in "2-1. insulating member assembling step", the insulating member 170 is assembled to the electrode body 110. FIG. 5 is a side view of the electrode body 110 before the insulating member 170 is assembled. In other words, the electrode body 110 shown in FIG. 5 is manufactured in the electrode body manufacturing step in which the positive electrode plates 120, the negative electrode plates 130, and the separators 140 are laminated.

In FIG. 5, in the electrode body 110, the upper surface 112, from which the positive electrode tab 150 and the negative electrode tab 160 project, faces upward. The insulating member 170 is shown above the electrode body 110. The insulating member 170 shown in FIG. 5 directs the tip of the end having the inclined portions 171, 173 towards the electrode body 110.

Figure 6:
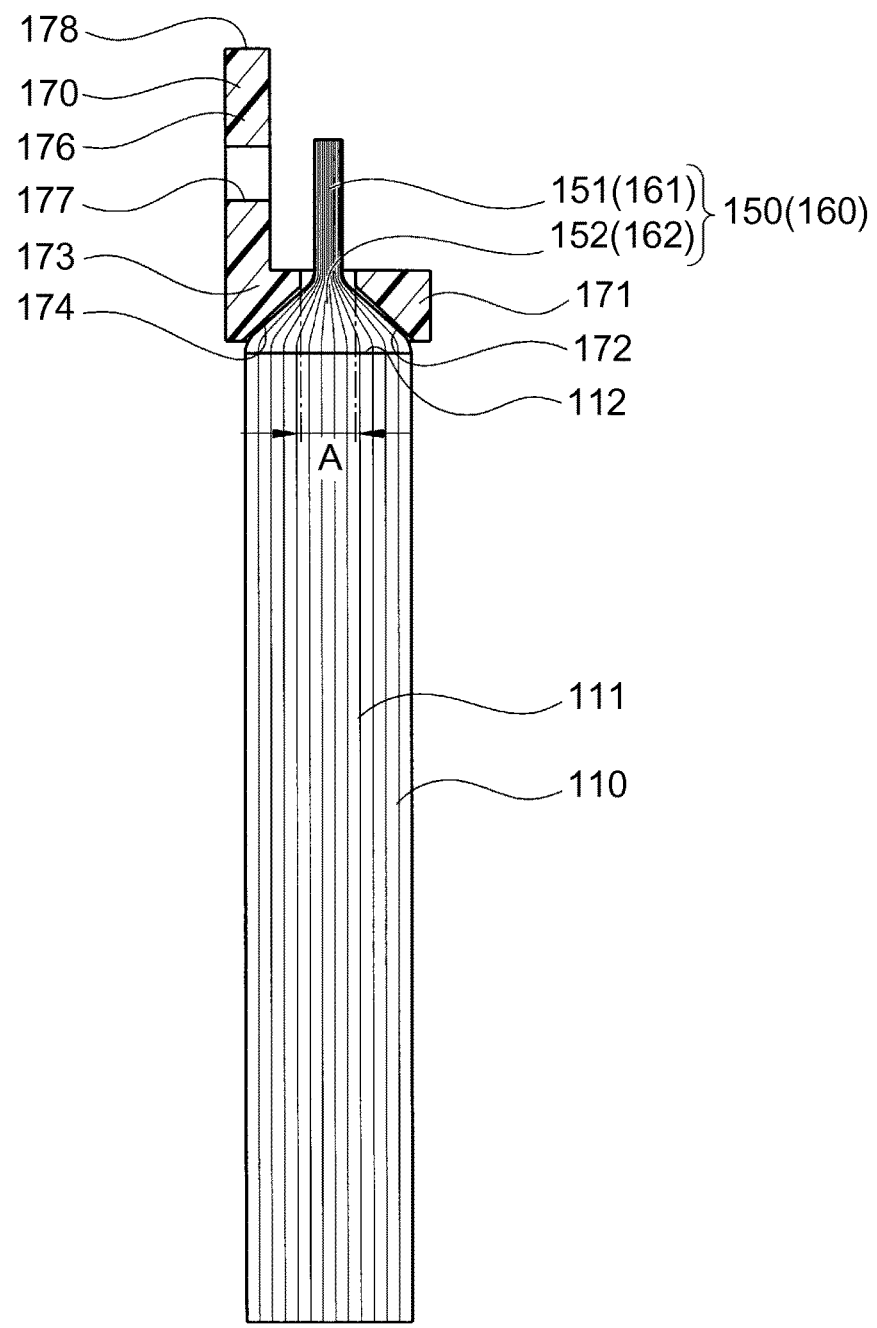
FIG. 6 is a view for explaining an insulating member assembling step according to the embodiment.

In the insulating member assembling step, by moving the insulating members 170 downwardly from the state shown in FIG. 5, the insulating members 170 are assembled to the positive electrode tab 150 and the negative electrode tab 160, respectively. In addition to moving the insulating members 170 downwardly, the electrode body 110 may be moved upwardly. Alternatively, the insulating members 170 and the electrode body 110 may be moved towards each other. FIG. 6 shows the electrode body 110 to which the insulating member 170 is assembled.

As shown in FIG. 6, the insulating members 170 are assembled to the positive electrode tab 150 and the negative electrode tab 160 of the electrode body 110 in a state where the tip sides of the inclined portions 171, 173 face the lamination part 111 of the electrode body 110. Specifically, with regard to the positive electrode tab 150, the insulating member 170 is assembled so that the inclined portion 171 and the inclined portion 173 sandwich a position near a base part of the positive electrode tab 150 projecting from the lamination part 111. In other words, the position of the positive electrode tab 150 sandwiched between the inclined portions 171, 173 of the insulating member 170 is a position between the connecting place 151 with which the positive electrode terminal 125 is connected, and the lamination part 111.

Further, the insulating member 170 sandwiches the positive electrode tab 150 from outer side in the lamination direction by using the inclined surface 172 of the inclined portion 171 and the inclined surface 174 of the inclined portion 173. As the positive electrode tab 150 is sandwiched between the inclined portions 171, 173, the positive electrode tab inclined portion 152 is formed in positive electrode tab 150, which is deformed into a shape along the inclined surfaces 172, 174.

In the positive electrode tab inclined portion 152, each of the positive electrode projecting portions 123 that structures the positive electrode tab 150 is pressed in the direction so that the positive electrode projecting portions 123 become closer to each other as they extend from the lamination part 111. In other words, by forming the positive electrode tab inclined portion 152, each of the positive electrode projecting portions 123 of the positive electrode tab 150 is gathered towards an inner side in the lamination direction as they extend from the lamination part 111. Therefore, the both outer-side surfaces of the positive electrode tab inclined portion 152 in the lamination direction are inclined so as to become narrower as they extend from the lamination part 111.

Further, the insulating member 170 is assembled so as to allow the positive electrode tab 150 to pass through the gap A between the inclined portion 171 and the inclined portion 173. Therefore, the connecting place 151 of the positive electrode tab 150 projects from the inclined portions 171, 173 towards the end surface 178, which is the end on the opposite side of the inclined portions 171, 173.

The insulating member 170 is also assembled to the negative electrode tab 160 similarly to the positive electrode tab 150. In other words, at a position between the connecting place 161 of the negative electrode tab 160, and the lamination part 111, the insulating member 170 is sandwiched between the inclined surfaces 172, 174 of the inclined portions 171, 173 from the outer sides in the lamination direction in a state where the tip sides of the inclined portions 171, 173 face the lamination part 111. Thus, in the negative electrode tab 160, the negative electrode tab inclined portion 162 is formed, which is deformed into a shape along the inclined surfaces 172, 174. The insulating member 170 is assembled to the negative electrode tab 160 so that the negative electrode tab 160 is passed through the gap A between the inclined portions 171, 173 and the connecting place 161 projects towards the end surface 178 that is the end on the opposite side of the inclined portions 171, 173.

The connecting place 151 of the positive electrode tab 150 is closer to the tip side in the projecting direction than the positive electrode tab inclined portion 152 that is formed as the insulating member 170 is assembled. The connecting place 161 of the negative electrode tab 160 is also closer to the tip side in the projecting direction than the negative electrode tab inclined portion 162 that is formed as the insulating member 170 is assembled. Therefore, thicknesses of the connecting places 151, 161 of the positive electrode tab 150 and the negative electrode tab 160 in the lamination direction are smaller than the thickness of the lamination part 111. This is because, as stated earlier, the gap A between the inclined portions 171, 173 is narrower than the thickness of the lamination part 111.

Next, in the assembling step, "2-2. assembly structuring step" is carried out. In the assembly structuring step according to this embodiment, the electrode body 110, to which the insulating member 170 is assembled, and the sealing member 104, to which the positive electrode terminal 125 and the negative electrode terminal 135 are assembled, are assembled to each other. In other words, in this embodiment, the positive electrode terminal 125 and the negative electrode terminal 135 are assembled to the sealing member 104 in advance as shown in FIG. 7.

Figure 7:
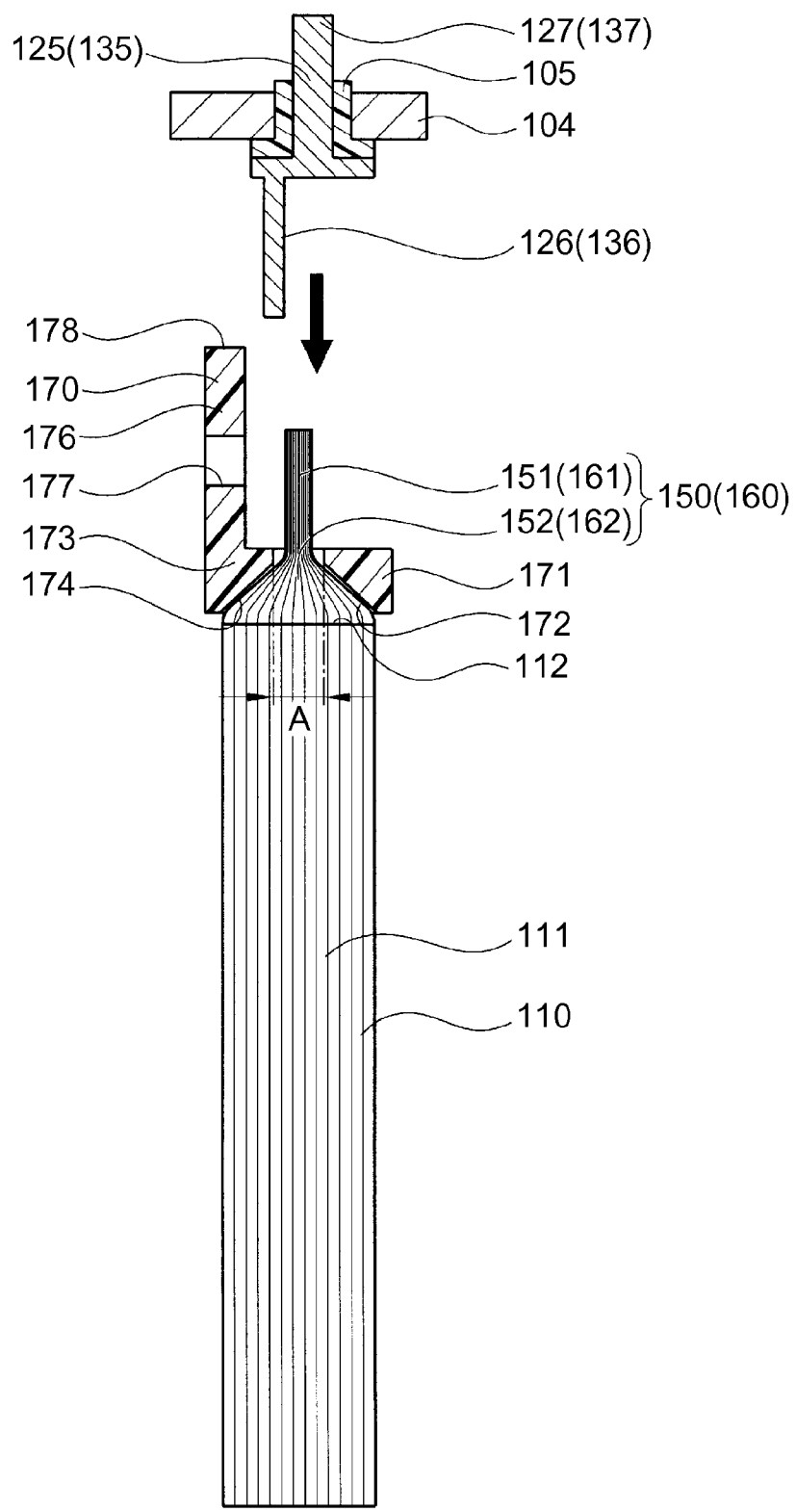
FIG. 7 is a view for explaining an assembly structuring step according to the embodiment.

As shown in FIG. 7, the positive electrode terminal 125 is assembled to the sealing member 104 so that the connecting end 126 projects downwardly and the exposed end 127 projects upwardly. A lower surface, which is a surface of the sealing member 104 on the lower side, is a surface on an inner side of the battery case 102. An upper surface, which is a surface of the sealing member 104 on the upper side, is a surface on an outer side of the battery case 102. In other words, the positive electrode terminal 125 is assembled to the sealing member 104 so that the connecting end 126 projects to the inner surface side of the sealing member 104 and the exposed end 127 projects to the outer surface side of the sealing member 104.

Similarly to the positive electrode terminal 125, the negative electrode terminal 135 is also assembled to the sealing member 104 so that the connecting end 136 projects to the inner surface side of the sealing member 104 and the exposed end 137 projects to the outer surface side of the sealing member 104. The gaskets 105 are assembled between the positive electrode terminal 125 and the negative electrode terminal 135, and the sealing member 104, respectively.

Figure 8:
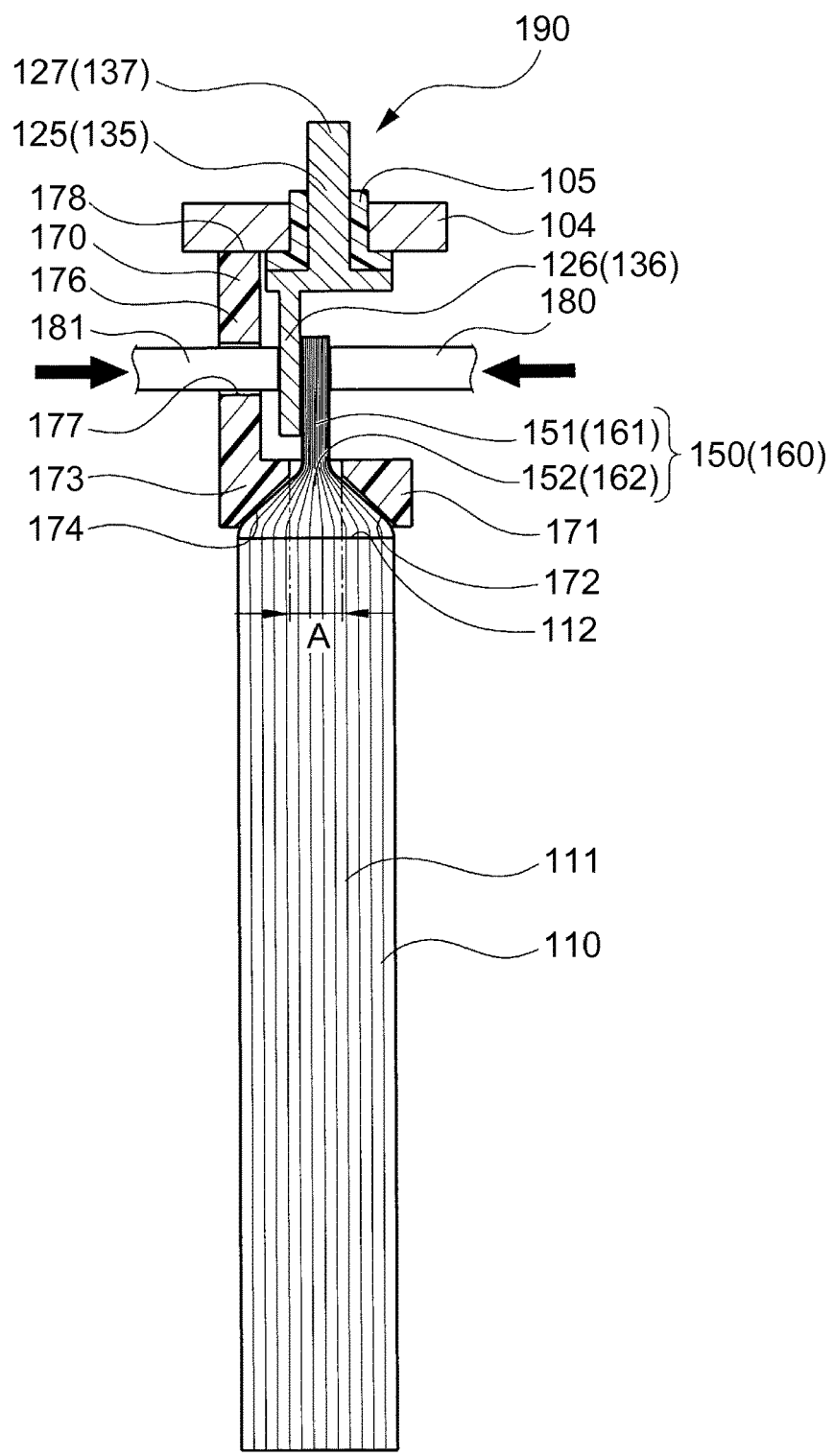
FIG. 8 is a view for explaining a terminal connecting step according to the embodiment.

The sealing member 104, to which the positive electrode terminal 125 and the negative electrode terminal 135 are assembled, is moved in the direction shown by an arrow in FIG. 7 and assembled to the electrode body 110. Specifically, the assembling is carried out so that the connecting end 126 of the positive electrode terminal 125 and the connecting place 151 of the positive electrode tab 150, and the connecting end 136 of the negative electrode terminal 135 and the connecting place 161 of the negative electrode tab 160 are superimposed on each other. Further, the assembling is carried out so that the lower surface, which is on the inner surface side of the sealing member 104, comes into contact with the end surface 178 of the insulating member 170. FIG. 8 shows a state after the above-mentioned assembling.

As shown in FIG. 8, since the assembling is carried out so that the lower surface of the sealing member 104 is in contact with the end surface 178 of the insulating member 170, the insulating member 170 is sandwiched between the sealing member 104 and the positive electrode tab inclined portion 152, or between the sealing member 104 and the negative electrode tab inclined portion 162. This is because, as stated earlier, the insulating member 170 sandwiches both outer-side surfaces of the positive electrode tab inclined portion 152 or the negative electrode tab inclined portion 162 in the lamination direction by using the inclined surfaces 172, 174 of the inclined portions 171, 173. In this way, the assembly 190 is structured, in which the sealing member 104, the electrode body 110, the insulating members 170, the positive electrode terminal 125, and the negative electrode terminal 135 are assembled. The end surface 178 of the insulating member 170 may be joined to the lower surface of the sealing member 104.

Then, in the assembling step, "2-3. terminal connecting step" is carried out in the state shown in FIG. 8. In this embodiment, the terminal connecting step is carried out by resistance welding. Specifically, as shown in FIG. 8, the connecting end 126 of the positive electrode terminal 125, and the connecting place 151 of the positive electrode tab 150, which are superimposed on each other, are sandwiched by welding jigs 180, 181 from both sides in the lamination direction.

While sandwiching them, the welding jig 181 on the side of the positive electrode terminal 125 is passed through the through hole 177 of the insulating member 170, and thus enabled to be in contact with the connecting end 126 of the positive electrode terminal 125. Also, in the sandwiching state, electricity is conducted between the welding jigs 180, 181, thereby joining the connecting end 126 of the positive electrode terminal 125 and the connecting place 151 of the positive electrode tab 150 to each other.

Similarly, on the side of the negative electrode terminal 135, the connecting end 136 and the connecting place 161 of the negative electrode tab 160 are sandwiched between the welding jigs 180, 181 from both sides in the lamination direction, and electricity is conducted between the welding jigs 180, 181. Thus, the connecting end 136 of the negative electrode terminal 135 and the connecting place 161 of the negative electrode tab 160 are joined to each other. This step may be carried out by not only resistance welding, but also ultrasonic welding.

Next, "3. insertion step" is carried out. In this step, out of the assembly 190, in which the sealing members 104, the electrode body 110, the insulating member 170, the positive electrode terminal 125, and the negative electrode terminal 135 are assembled, the electrode body 110 is inserted inside the case body 103. This step is explained in FIG. 9.

Figure 9:
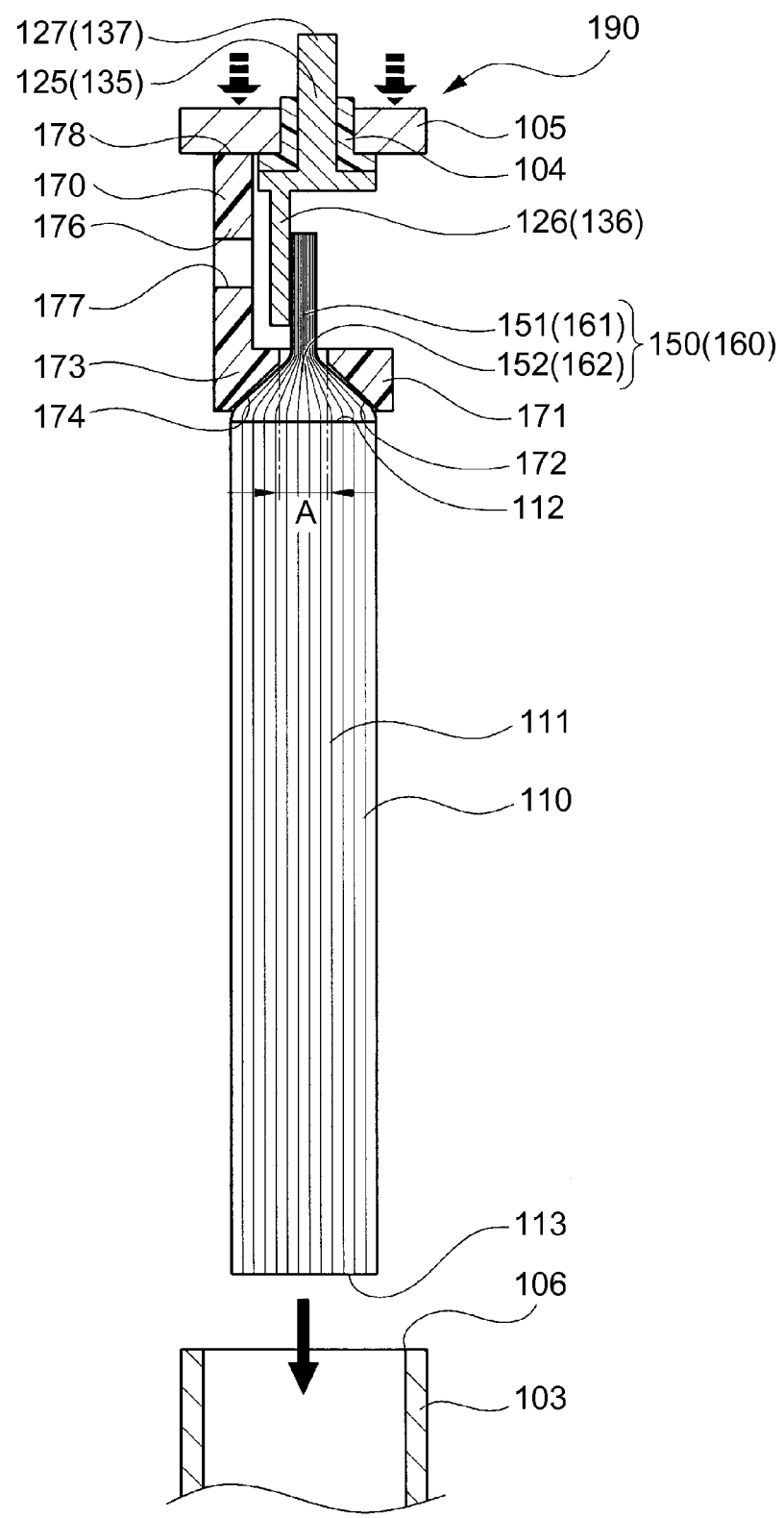
FIG. 9 is a view for explaining an insertion step according to the embodiment.

As shown in FIG. 9, the assembly 190 is arranged so that the lower surface 113 of the electrode body 110 faces an opening 106 of the case body 103. Then, in the state shown in FIG. 9, the upper surface, which is on the outer surface side of the sealing member 104, is pressed towards inside the case body 103. In other words, a pressing load applied to the upper surface of the sealing member 104 is directed downward in FIG. 9. The pressing enables the electrode body 110 of the assembly 190 to be inserted into the case body 103 from the lower surface 113. In the insertion step, a load is applied by the lower surface of the sealing member 104, which is on the inner surface side of the sealing member 104, until the opening 106 of the case body 103 is closed.

In this embodiment, it is possible to carry out the insertion step without damaging the electrode body 110. This is because, in the electrode body 110 according to this embodiment, the positive electrode tab inclined portion 152 of the positive electrode tab 150 and the negative electrode tab inclined portion 162 of the negative electrode tab 160 are able to receive the pressing load applied to the upper surface of the sealing member 104.

In other words, the pressing load applied to the upper surface of the sealing member 104 is applied to the electrode body 110 through the insulating members 170 that are in contact with the lower surface of the sealing member 104. The pressing from the sealing member 104 onto the end surfaces 178 of the insulating members 170 is also directed downward in FIG. 9. Therefore, due to the pressing load received by the end surfaces 178 of the insulating members 170, the insulating members 170 press the positive electrode tab inclined portion 152 and the negative electrode tab inclined portion 162 downwardly in FIG. 9 by using the inclined surfaces 172, 174 of the inclined portions 171, 173. Thus, the positive electrode tab inclined portion 152 and the negative electrode tab inclined portion 162 in the electrode body 110 according to this embodiment are able to receive the pressing load in the insertion step.

It is thus possible to apply a larger pressing load onto the positive electrode tab inclined portion 152 and the negative electrode tab inclined portion 162, than that applied onto the upper surface 112 of the lamination part 111. In this embodiment, even if a large pressing load is applied to the positive electrode tab inclined portion 152 and the negative electrode tab inclined portion 162, bending or breakage of the positive electrode plates 120 and the negative electrode plates 130 is restrained.

As stated earlier, the upper surface 112, which is the side surface of the lamination part 111, is structured from the end portions of the positive electrode plates 120, the negative electrode plates 130, and the separators 140. The positive electrode plates 120, the negative electrode plates 130, and the separators 140 all have a thin-foil shape. Therefore, when force is applied to the upper surface 112 of the lamination part 111, damages such as bending and breakage are likely to happen in the end portions of the positive electrode plates 120, the negative electrode plates 130, and the separators 140, which structure the upper surface 112.

On the other hand, in this embodiment, the end portions of the positive electrode plates 120, the negative electrode plates 130, and the separators 140 are not exposed in the positive electrode tab inclined portion 152 and the negative electrode tab inclined portion 162 that receive the pressing load from the inclined surfaces 172, 174 of the inclined portion 171, 173. Hence, the positive electrode tab inclined portion 152 and the negative electrode tab inclined portion 162 are able to receive a large pressing load while restraining damages of the positive electrode plates 120 and the negative electrode plates 130.

Also, the downward pressing load applied by the inclined surfaces 172, 174 of the inclined portion 171, 173 is also received by the positive electrode tab inclined portion 152 in the thickness direction of the plurality of positive electrode projecting portions 123 that structure the positive electrode tab inclined portion 152, in proportion to inclination of the inclined surfaces 172, 174. Also, the downward pressing load applied by the inclined surfaces 172, 174 of the inclined portions 171, 173 is received by the negative electrode tab inclined portion 162 in the thickness direction of the plurality of negative electrode projecting portions 133 that structure the negative electrode tab inclined portion 162, in proportion to inclination of the inclined surfaces 172, 174.

The inclined surfaces 172, 174 of the inclined portions 171, 173 are inclined in a direction in which the inclined surfaces 172, 174 are separated from each other as they extend towards the lower tips of the inclined portions 171, 173 in FIG. 9. Also, the positive electrode tab inclined portion 152 and the negative electrode tab inclined portion 162 are inclined in a direction in which upper side portions of the positive electrode tab inclined portion 152 and the negative electrode tab inclined portion 162, which are away from the lamination part 111, become narrow in the lamination direction in FIG. 9. This is because the inclined surfaces 172, 174 of the inclined portions 171, 173, the positive electrode projecting portion 123 in the positive electrode tab inclined portion 152, and the negative electrode projecting portion 133 in the negative electrode tab inclined portion 162 are inclined with respect to the downward pressing shown in FIG. 9 received by the insulating members 170.

The positive electrode tab inclined portion 152, which is structured by laminating the plurality of positive electrode projecting portions 123, has high strength against pressing in the thickness direction of the positive electrode projecting portions 123. Therefore, it is unlikely that a pressing load applied by the inclined surfaces 172, 174 of the inclined portions 171, 173 causes bending and breakage of the positive electrode projecting portions 123 that structure the positive electrode tab inclined portion 152.

Since the negative electrode tab inclined portion 162 is also structured by laminating the plurality of negative electrode projecting portions 133, the negative electrode tab inclined portion 162 has high strength against a pressing load in the thickness direction of the negative electrode projecting portions 133. Therefore, in the negative electrode tab inclined portion 162, it is also unlikely that a pressing load applied by the inclined surfaces 172, 174 of the inclined portions 171, 173 causes bending and breakage of the negative electrode projecting portions 133.

Thus, in this embodiment, it is possible to carry out the insertion step without damaging the positive electrode plates 120, the negative electrode plates 130, and the separators 140 that structure the electrode body 110. In other words, the assembly 190 is manufactured by assembling the insulating members 170 and so on in the assembling step to the electrode body 110 that is manufactured in the electrode body manufacturing step. Then, in the insertion step, the electrode body 110 of the assembly 190 is inserted inside the case body 103. Thus, it is possible to manufacture the battery 100 without damaging any of the positive electrode plates 120, the negative electrode plates 130, and the separators 140 that structure the electrode body 110.

After the insertion step, the case body 103 of the battery case 102 and the sealing member 104 are joined to each other. Also, injection of the electrolytic solution 101 into the battery case 102, and so on are carried out. The electrolytic solution 101 may be injected inside the case body 103 prior to the insertion step. Alternatively, the electrolytic solution 101 may be injected simultaneously with the insertion step. Alternatively, for example, a filler hole may be provided in the sealing member 104 in advance, and the electrolytic solution 101 may be injected from the filler hole after the case body 103 and the sealing member 104 are joined to each other.

Further, as stated earlier, in the insulating member 170 according to this embodiment, the inclined surfaces 172, 174 are formed so that the angles θ with respect to the lamination direction of the electrode body 110 fall within a range of 30° or larger but not exceeding 60°. Because the inclined surfaces 172, 174 are formed as above, the positive electrode tab 150 or the negative electrode tab 160 are restrained from being damaged when the insulating member 170 is assembled to the positive electrode tab 150 or the negative electrode tab 160. Furthermore, it is possible to apply a pressing load in the insertion step to the electrode body 110 adequately.

When the angles θ of the inclined surfaces 172, 174 are too small, the positive electrode tab 150 or the negative electrode tab 160 is deformed too much when the insulating member 170 is assembled. This could cause bending and breakage of the positive electrode projecting portions 123 that structure the positive electrode tab 150 or the negative electrode projecting portions 133 that structure the negative electrode tab 160. On the other hand, when the angles θ of the inclined surfaces 172, 174 are too large, a pressing load in the insertion step could not be applied to the positive electrode tab inclined portion 152 or the negative electrode tab inclined portion 162 adequately.

In the assembling step according to this embodiment, the insulating member assembling step is carried out before the terminal connecting step as explained earlier. Specifically, after the insulating member 170 is assembled to the positive electrode tab 150, the connecting end 126 of the positive electrode terminal 125 and the connecting place 151 of the positive electrode tab 150 are joined to each other. Then, as shown in FIG. 6, the positive electrode tab 150 is gathered in the lamination direction at the portion of the connecting place 151 as the insulating member 170 is assembled.

In other words, as the insulating member 170 is assembled, the connecting place 151 to be connected with the positive electrode terminal 125 is formed in the positive electrode tab 150. Therefore, when carrying out the terminal connecting step, no special construction is necessary to gather the tip side of the positive electrode tab 150 in the projecting direction to form the connecting place 151. In this embodiment, it is possible to superimpose and join the connecting end 126 of the positive electrode terminal 125 onto the connecting place 151 of the positive electrode tab 150 as it is, which is formed by assembling the insulating member 170.

Moreover, because the insulating member 170 is assembled, the positive electrode projecting portions 123 in the connecting place 151 of the positive electrode tab 150 are restrained from shifting. In addition, tension in the positive electrode tab 150 while welding is alleviated. Thus, it is possible to effectively carry out the assembling step while preventing the positive electrode projecting portions 123 in the positive electrode tab 150 from being damaged. This also applies to the negative electrode terminal 135 and the negative electrode tab 160.

Figure 10:
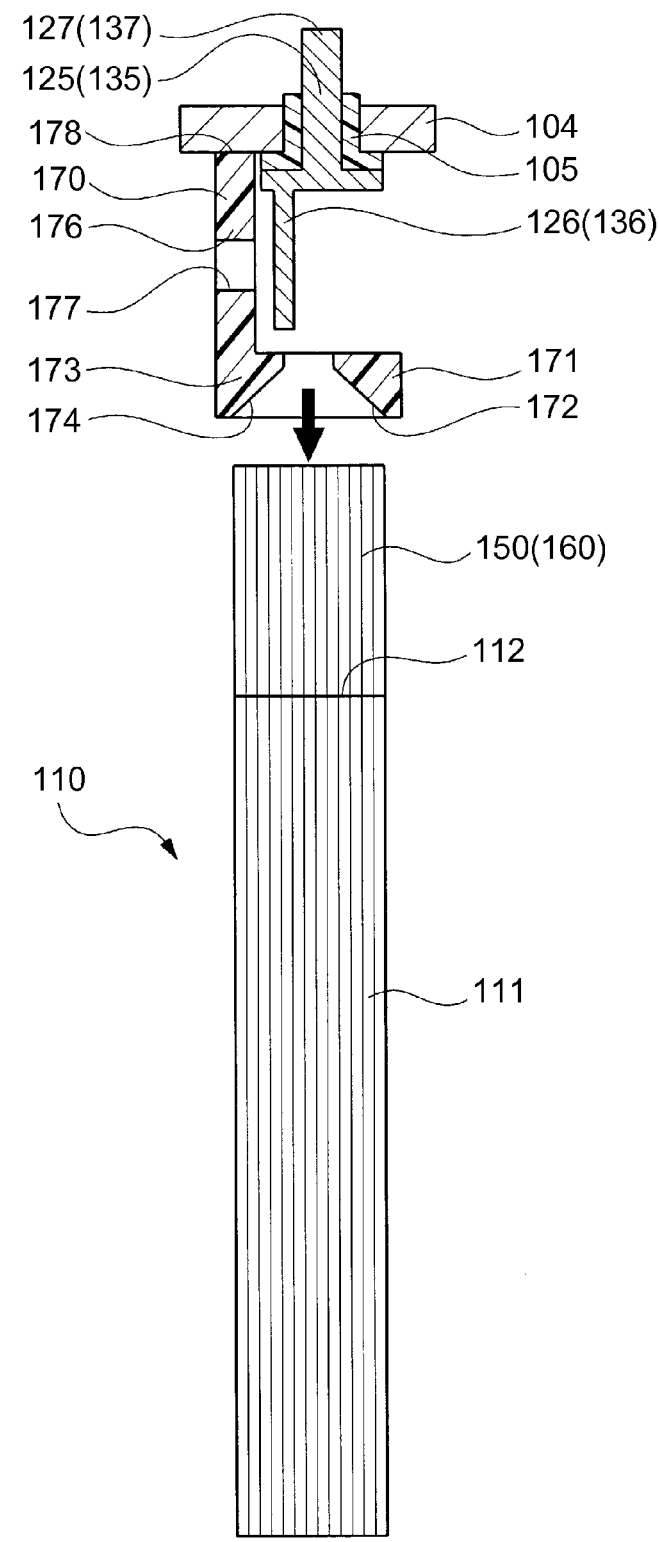
FIG. 10 is a view for explaining a modified example of the assembling step.

In the foregoing assembling step, the insulating member assembling step and the assembly structuring step are carried out separately. However, the insulating member assembling step and the assembly structuring step can be carried out simultaneously. As shown in FIG. 10, the end surfaces 178 of the insulating members 170 may be joined to the inner surface side of the sealing member 104 in advance, and then the assembly 190 may be structured so that these insulating members 170 are assembled to the positive electrode tab 150 and the negative electrode tab 160, respectively.

Figure 11:
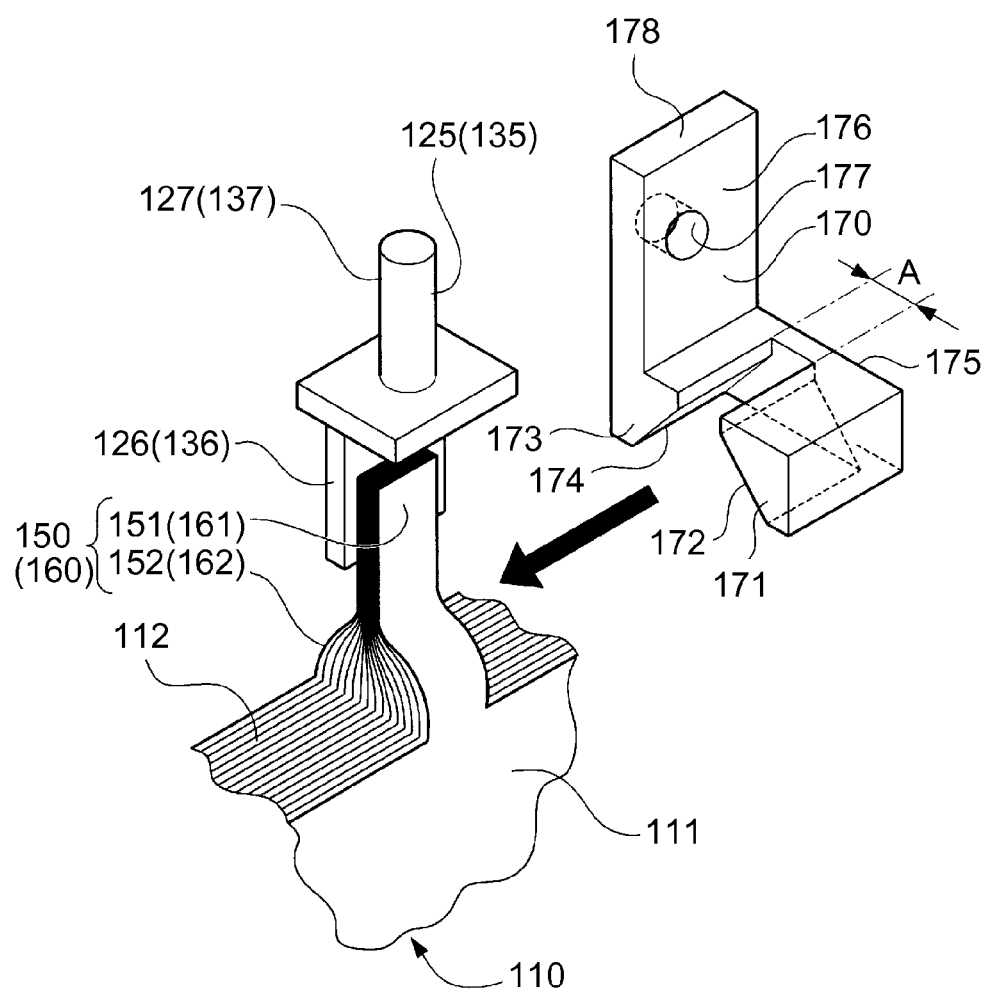
FIG. 11 is a view for explaining a modified example in a case where the insulating member assembling step is carried out after the terminal connecting step.

It is also possible to carry out the terminal connecting step before the insulating member assembling step. The positive electrode terminal 125 is connected with the positive electrode tab 150 shown in FIG. 11 because the terminal connecting step is carried out already. Then, as shown in FIG. 11, the insulating member 170 may be assembled between the connecting place 151 of the positive electrode tab 150, with which the positive electrode terminal 125 is connected already, and the lamination part 111. It is also true for this case that the insertion step can be carried out without damaging the positive electrode plates 120, the negative electrode plates 130, and the separators 140 of the electrode body 110. The insulating member 170 in this case does not have to have the through hole 177 in the connection portion 176 because the terminal connecting step is already done.

The insulating member 170 used in the battery 100 according to this embodiment is made by linking the inclined portion 171 and the inclined portion 173 through the linked portion 175 as shown in FIG. 4. However, as shown in a battery 200 in FIG. 12, two insulating members 270, 280 having inclined portions 271, 281 in one ends, respectively, may be used as a pair.

In the two insulating members 270, 280 used in the battery 200, inclined surfaces 272, 282 are formed on surfaces of the inclined portions 271, 281, which are provided in one ends of the insulating members 270, 280, on sides that face each other, and the inclined surfaces 272, 282 are inclined so as to be away from each other as they extend to tip sides. Furthermore, a gap A is provided between the inclined portions 271, 281 that face each other. The insulating members 270, 280 may also be made from an insulating material such as PP.

In the insulating members 270, 280, the inclined surfaces 272, 282 of the inclined portions 271, 281 are in contact with both outer-side surfaces of a positive electrode tab inclined portion 152 of a positive electrode tab 150 in the lamination direction. Further, end surfaces 275, 285, which are the other ends of the inclined portions 271, 281 of the insulating members 270, 280, respectively, are in contact with a lower surface, which is an inner surface of a sealing member 104. This is the same for insulating members 270, 280 assembled to a negative electrode tab 160 side. Therefore, the insulating members 270, 280 are sandwiched between both outer-side surfaces of the positive electrode tab inclined portion 152 and the negative electrode tab inclined portion 162, and the sealing member 104.

Figure 12:
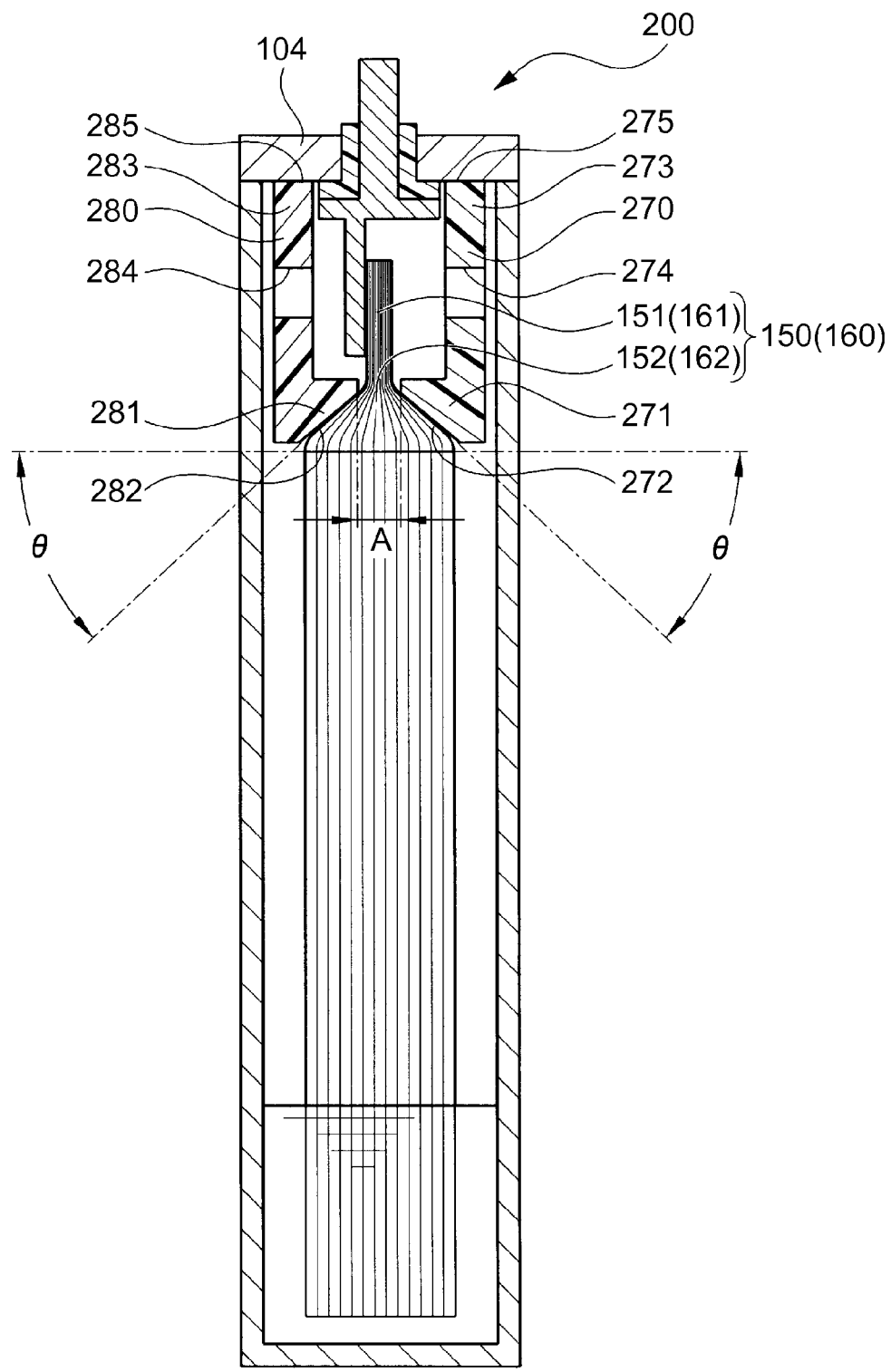
FIG. 12 is a view for explaining a modified example of the insulating member.

It is also possible to manufacture the battery 200 shown in FIG. 12 without damaging positive electrode plates 120, negative electrode plates 130, and separators 140 of an electrode body 110 because of the foregoing procedures of the electrode body manufacturing step, the assembling step, and the insertion step. This is because a pressing load applied to an outer surface of the sealing member 104 in the insertion step may be applied by the insulating members 270, 280 to the positive electrode tab inclined portion 152 and the negative electrode tab inclined portion 162 of the electrode body 110. In the assembling step, in a case where the terminal connecting step is carried out after the insulating member assembling step, welding may be carried out after passing welding jigs through a through hole 274 in the connection portion 273 of the insulating member 270, and a through hole 284 in a connection portion 283 of the insulating member 280, respectively.

Figure 13:
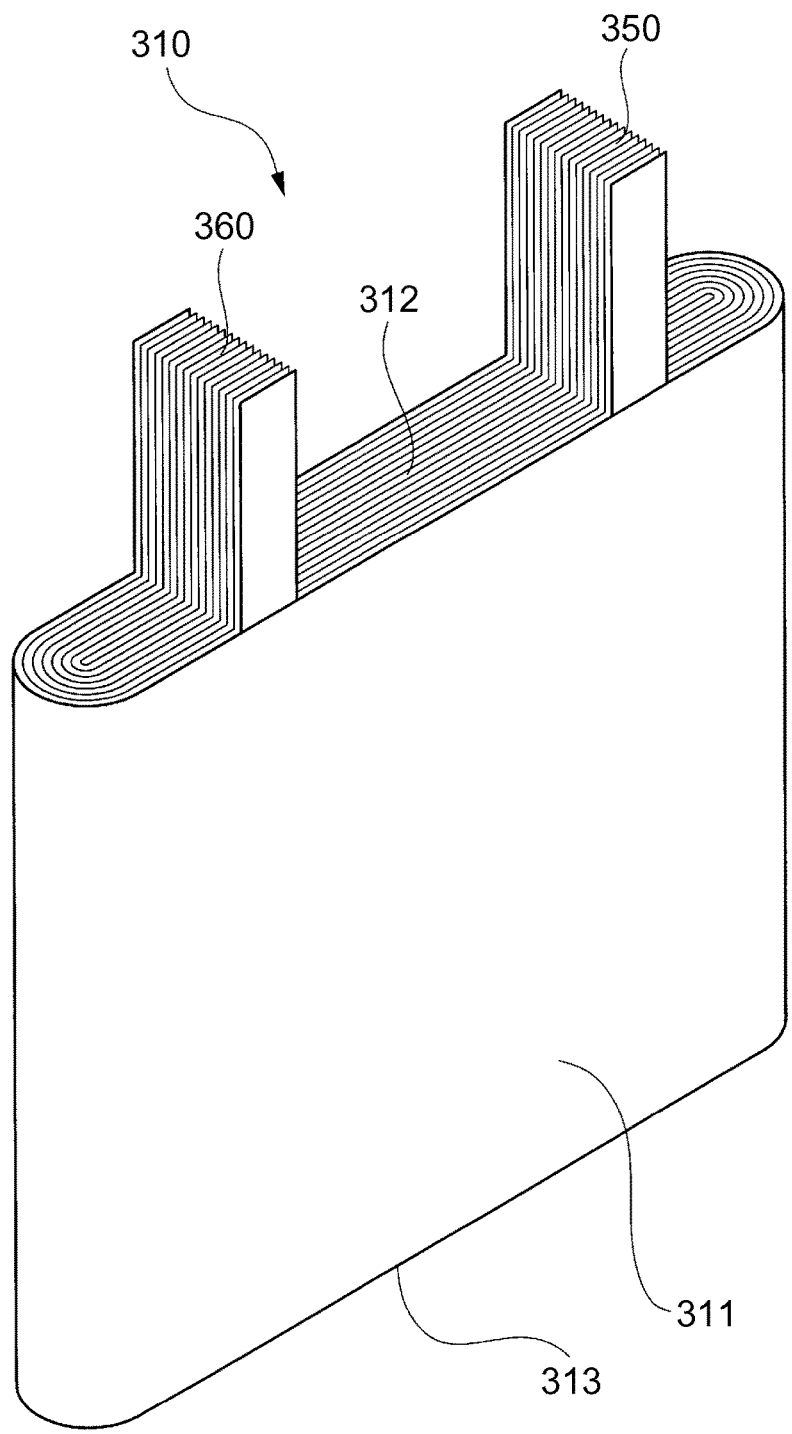
FIG. 13 is a view for explaining a winding type electrode body.

In the foregoing, the electrode body 110 is explained as a lamination type electrode body. However, the invention is also applicable to a winding type electrode body 310 shown in FIG. 13. The electrode body 310 has a structure in which a long positive electrode plate and a long negative electrode plate are laminated as they are wound in the longitudinal direction while sandwiching a separator between the positive electrode plate and the negative electrode plate. In the electrode body 310 used here has a plurality of projecting portions provided as positive electrode plates and negative electrode plates in end portions of the lamination part 311 on an upper surface 312 side. Active material layers are formed in portions of the positive electrode plate and the negative electrode plate, which become a lamination part 311. In the projecting portions of the positive electrode plate and the negative electrode plate, no active material layer is formed, and current collector foil is thus exposed.

The electrode body 310 has a positive electrode tab 350 that is structured by bundling only the positive electrode projecting portions of the positive electrode plate by lamination in a state of projecting from the lamination part 311. In other words, in the positive electrode tab 350, the plurality of positive electrode projecting portions are laminated. The electrode body 310 has a negative electrode tab 360 that is structured by bundling only the negative electrode projecting portions of the negative electrode plate by lamination in a state of projecting from the lamination part 311. In other words, in the negative electrode tab 360, the plurality of negative electrode projecting portions are laminated. Both the positive electrode tab 350 and the negative electrode tab 360 project from the upper surface 312 of the lamination part 311.

Then, the electrode body 310 may be used instead of the electrode body 110 in the foregoing batteries 100, 200. This is because the positive electrode tab 350 and the negative electrode tab 360 of the electrode body 310 are structured in the same way as the positive electrode tab 150 and the negative electrode tab 160 of the electrode body 110.

Thus, with regard to the electrode body 310, similarly to the electrode body 110, it is only necessary that the insulating members 170, the insulating members 270, 280 or the like are assembled to the positive electrode tab 350 and the negative electrode tab 360, respectively, and then an insertion step is carried out for inserting a lower surface 313 of the electrode body 310 towards an opening 106 of a case body 103. It is possible to carry out the insertion step by applying a pressing load to an upper surface of a sealing member 104. Since it is not necessary to apply a pressing load onto an upper surface 312 of the lamination part 311, it is possible to restrain damages of the electrode plates and so on in the lamination part 311. The electrode body 310 is of a flat-shaped winding type. However, the invention is also applicable to a winding type electrode body that is wound into a cylinder shape.

As explained in detail so far, the battery according to this embodiment has the insulating members sandwiched between the positive electrode tab and the negative electrode tab, and the sealing member, respectively. In the insertion step, it is possible to apply a pressing load from the insulating members onto the positive electrode tab inclined portion of the positive electrode tab, and the negative electrode tab inclined portion of the negative electrode tab. Therefore, it is possible to carry out the insertion step without applying a pressing load on the side surface of the lamination part of the electrode body, the side surface being structured by end portions of the electrode plates and so on. Thus, a manufacturing method for a secondary battery and the secondary battery are realized, in which damages of the electrode plates and the separators in the electrode body are prevented.

The modes according to this embodiment are just examples, and do not limit the invention. Therefore, naturally, various improvements and deformations may be made in the invention without departing from the gist of the invention. For example, each of the electrode bodies explained in the foregoing embodiment has the structure in which the positive electrode tab and the negative electrode tab project from one of side surfaces of the lamination part. However, in the electrode body, it is only necessary that at least either the positive electrode tab or the negative electrode tab projects from a side surface of the lamination part. This is because, by assembling the insulating member to the electrode tab projecting from the side surface of the lamination part, it is possible to carry out the insertion step without applying a pressing load to the side surface of the electrode body.

Also, for example, the end surface 178 of the insulating member 170 may be in contact with the positive electrode terminal 125 or the negative electrode terminal 135 instead of the sealing member 104. This means that the insulating member 170 may be sandwiched between the sealing member 104 and the positive electrode tab inclined portion 152 or the negative electrode tab inclined portion 162 through another member. This is because a pressing load can be applied to the insulating member 170 in the insertion step, and the pressing load in the insertion step can be applied to the positive electrode tab inclined portion 152 or the negative electrode tab inclined portion 162 of the electrode body 110 through the insulating member 170. This is also true for the insulating members 270, 280. Further, this is also true for a battery in which the electrode body 310 is used.

Yet further, the insulating members 170, 270, 280 only need to ensure insulation between the sealing member 104 and the electrode body, and, naturally, are not limited to PP. In other words, the insulating member 170, 270, 280 may be structured so that only the inclined surfaces of the inclined end portions are made from an insulating material. Furthermore, the invention is applicable to, for example, a nickel hydrogen secondary battery and so on, other than a lithium ion secondary battery.

What is claimed is:

1. A manufacturing method for a secondary battery in which an electrode body, a battery case, and an electrode terminal are included, the electrode body being made by laminating a positive electrode plate and a negative electrode plate while sandwiching a separator between the positive electrode plate and the negative electrode plate, the positive electrode plate and the negative electrode plate being made by forming an active material layer on current collector foil, the battery case having a case body in which an opening is formed, and a sealing member that covers the opening of the case body, the battery case housing the electrode body inside of the battery case, the electrode terminal being assembled to the sealing member and having a connecting end and an exposed end, the connecting end being connected with the electrode body on an inner side of the battery case, and the exposed end being exposed outside the battery case, in which the positive electrode plate and the negative electrode plate include charge and discharge parts and projecting portions, respectively, the charge and discharge parts being parts where the active material layers are formed and being superimposed on each other through the positive electrode plate, the negative electrode plate, and the separator due to lamination in the electrode body, and the projecting portions being portions where the active material layers are not formed and the current collector foil is thus exposed, and the projecting portions projecting from parts of end parts of the charge and discharge parts, and the electrode body includes a lamination part and an electrode tab, the lamination part being made by laminating the charge and discharge parts of the positive electrode plate and the negative electrode plate together with the separator, the electrode tab being structured by bundling only the projecting portion of either the positive electrode plate or the negative electrode plate in a state of projecting from the lamination part, the electrode tab being connected with the connecting end of the electrode terminal, the electrode body being housed in the battery case so that a side surface of the electrode body, where the electrode tab projects, is directed towards the sealing member, the manufacturing method for a secondary battery comprising:
  manufacturing the electrode body, by which the electrode body is made by laminating the positive electrode plate, the negative electrode plate, and the separator while allowing the electrode tab to project from a side surface of the lamination part;
  manufacturing and assembling an assembly of an insulating member, the electrode body, the sealing member, and the electrode terminal by assembling the insulating member having an insulating property, the electrode body, the sealing member, and the electrode terminal, the insulating member having a first inclined portion and a second inclined portion provided in one end of the insulating member so that the first inclined portion and the second inclined portion face each other, and also having a gap provided between the first inclined portion and the second inclined portion, thereby forming inclined surfaces on surfaces of the first inclined portion and the second inclined portion on sides facing each other, the inclined surfaces being inclined in a direction in which the first inclined portion and the second inclined portion are separated from each other as the first inclined portion and the second inclined portion extend to tip sides;
  inserting the electrode body of the assembly inside the case body via the opening of the case body; and
  sealing the opening of the case body by covering the opening with the sealing member, wherein,
  when carrying out the assembling, the insulating member is assembled to the electrode tab at a position between a connecting place of the electrode tab, which is connected with the connecting end of the electrode terminal, and the lamination part, in a state where the tip sides of the first inclined portion and the second inclined portion are directed towards the lamination part, by sandwiching the electrode tab by using the inclined surfaces of the first inclined portion and the second inclined portion from outer sides in a lamination direction, and by passing the electrode tab through the gap between the first inclined portion and the second inclined portion, thus allowing the connecting place to project to the other end on an opposite side of the first inclined portion and the second inclined portion, and a base part of the electrode tab is brought into contact with the inclined surfaces, when carrying out the assembling, the electrode terminal is assembled to the sealing member so that the exposed end projects on an outer surface of the sealing member on an outer side of the battery case, and the insulating member is sandwiched between both outer-side surfaces of the electrode tab in the lamination direction, and an inner surface of the sealing member on an inner side of the battery case, thereby structuring the assembly, the outer-side surfaces being sandwiched between the inclined surfaces of the first inclined portion and the second inclined portion, when carrying out the assembling, the connecting end of the electrode terminal is connected with the connecting place of the electrode tab, and as the insulating member, an insulating member is used, in which inclination angles of the inclined surfaces of the first inclined portion and the second inclined portion with respect to the lamination direction of the assembly are within a range of 30° or larger but not exceeding 60°.

2. The manufacturing method according to claim 1, wherein
when carrying out the assembling, the insulating member is assembled to the electrode tab before the connecting end of the electrode terminal is connected with the connecting place of the electrode tab.

3. The manufacturing method according to claim 1, wherein
when carrying out the assembling, the electrode tab is deformed into a shape along the inclined surfaces of the first inclined portion and the second inclined portion by the inclined surfaces.

4. A manufacturing method for a secondary battery in which an electrode body, a battery case, and an electrode terminal are included, the electrode body being made by laminating a positive electrode plate and a negative electrode plate while sandwiching a separator between the positive electrode plate and the negative electrode plate, the positive electrode plate and the negative electrode plate being made by forming an active material layer on current collector foil, the battery case having a case body in which an opening is formed, and a sealing member that covers the opening of the case body, the battery case housing the electrode body inside of the battery case, the electrode terminal being assembled to the sealing member and having a connecting end and an exposed end, the connecting end being connected with the electrode body on an inner side of the battery case, and the exposed end being exposed outside the battery case, in which the positive electrode plate and the negative electrode plate include charge and discharge parts and projecting portions, respectively, the charge and discharge parts being parts where the active material layers are formed and being superimposed on each other through the positive electrode plate, the negative electrode plate, and the separator due to lamination in the electrode body, and the projecting portions being portions where the active material layers are not formed and the current collector foil is thus exposed, and the projecting portions projecting from parts of end parts of the charge and discharge parts, and the electrode body includes a lamination part and an electrode tab, the lamination part being made by laminating the charge and discharge parts of the positive electrode plate and the negative electrode plate together with the separator, the electrode tab being structured by bundling only the projecting portion of either the positive electrode plate or the negative electrode plate in a state of projecting from the lamination part, the electrode tab being connected with the connecting end of the electrode terminal, the electrode body being housed in the battery case so that a side surface of the electrode body, where the electrode tab projects, is directed towards the sealing member, the manufacturing method for a secondary battery comprising:

manufacturing the electrode body, by which the electrode body is made by laminating the positive electrode plate, the negative electrode plate, and the separator while allowing the electrode tab to project from a side surface of the lamination part;

manufacturing and assembling an assembly of an insulating member, the electrode body, the sealing member, and the electrode terminal by assembling the insulating member having an insulating property, the electrode body, the sealing member, and the electrode terminal, the insulating member having a first inclined portion and a second inclined portion provided in one end of the insulating member so that the first inclined portion and the second inclined portion face each other, and also having a gap provided between the first inclined portion and the second inclined portion, thereby forming inclined surfaces on surfaces of the first inclined portion and the second inclined portion on sides facing each other, the inclined surfaces being inclined in a direction in which the first inclined portion and the second inclined portion are separated from each other as the first inclined portion and the second inclined portion extend to tip sides;

inserting the electrode body of the assembly inside the case body via the opening of the case body; and sealing the opening of the case body by covering the opening with the sealing member, wherein, when carrying out the assembling, the insulating member is assembled to the electrode tab at a position between a connecting place of the electrode tab, which is connected with the connecting end of the electrode terminal, and the lamination part, in a state where the tip sides of the first inclined portion and the second inclined portion are directed towards the lamination part, by sandwiching the electrode tab by using the inclined surfaces of the first inclined portion and the second inclined portion from outer sides in a lamination direction, and by passing the electrode tab through the gap between the first inclined portion and the second inclined portion, thus allowing the connecting place to project to the other end on an opposite side of the first inclined portion and the second inclined portion, and a base part of the electrode tab is brought into contact with the inclined surfaces, when carrying out the assembling, the electrode terminal is assembled to the sealing member so that the exposed end projects on an outer surface of the sealing member on an outer side of the battery case, and the insulating member is sandwiched between both outer-side surfaces of the electrode tab in the lamination direction, and an inner surface of the sealing member on an inner side of the battery case, thereby structuring the assembly, the outer-side surfaces being sandwiched between the inclined surfaces of the first inclined portion and the second inclined portion, when carrying out the assembling, the connecting end of the electrode terminal is connected with the connecting place of the electrode tab, and when inserting the electrode body inside the case body, the electrode body is inserted inside the case body by pressing the outer surface of the sealing member towards inside the case body while directing a side surface of the electrode body, on an opposite side of a side surface where the electrode tab projects, towards the opening of the case body.

* * * * *